US012428942B2

(12) United States Patent
Hinderliter et al.

(10) Patent No.: US 12,428,942 B2
(45) Date of Patent: Sep. 30, 2025

(54) OVERSIZED SWITCHGEAR TRAILER FOR ELECTRIC HYDRAULIC FRACTURING

(71) Applicant: U.S. Well Services, LLC, Houston, TX (US)

(72) Inventors: Brandon Hinderliter, Houston, TX (US); Jared Oehring, Houston, TX (US)

(73) Assignee: U.S. Well Services, LLC, Houston, TX (US)

( * ) Notice: Subject to any disclaimer, the term of this patent is extended or adjusted under 35 U.S.C. 154(b) by 122 days.

(21) Appl. No.: 18/109,389

(22) Filed: Feb. 14, 2023

(65) Prior Publication Data

US 2023/0272700 A1    Aug. 31, 2023

Related U.S. Application Data

(63) Continuation of application No. 16/824,432, filed on Mar. 19, 2020, now Pat. No. 11,578,577.
(Continued)

(51) Int. Cl.
*E21B 43/26* (2006.01)
*F01D 15/10* (2006.01)
(Continued)

(52) U.S. Cl.
CPC .......... *E21B 43/2607* (2020.05); *E21B 43/26* (2013.01); *F01D 15/10* (2013.01);
(Continued)

(58) Field of Classification Search
CPC ...... E21B 43/26; E21B 43/2607; F01D 15/10; F04B 17/03; F04B 35/04; F05D 2220/76;
(Continued)

(56) References Cited

U.S. PATENT DOCUMENTS 1,541,601 A    6/1925    Tribe
1,656,861 A    1/1928    Leonard
(Continued)

FOREIGN PATENT DOCUMENTS

CA    2406801 A1    11/2001
CA    2482943 A1    10/2003
(Continued)

OTHER PUBLICATIONS

Shafto, "Growth in electric-fracking fleets stunted by tight producer budgets," S&P Global Market Intelligence, Aug. 6, 2019, 4 pages.
(Continued)

*Primary Examiner* — Robert J Hoffberg
(74) *Attorney, Agent, or Firm* — Abel Schillinger, LLP

(57) ABSTRACT

A hydraulic fracturing system for fracturing a subterranean formation includes a primary switchgear arranged on a support structure. The system also includes a secondary switchgear, arranged on the support structure, the secondary switchgear positioned separately from the primary switchgear and within an enclosure, the secondary switchgear receiving an electrical input from the primary switchgear and including an plurality of feed connections for supplying electrical power to a plurality of fracturing equipment.

16 Claims, 13 Drawing Sheets

Related U.S. Application Data

(60) Provisional application No. 62/821,138, filed on Mar. 20, 2019.

(51) Int. Cl.
  *F04B 17/03* (2006.01)
  *F04B 35/04* (2006.01)
  *H02B 1/20* (2006.01)
  *H02B 1/24* (2006.01)
  *H02B 1/30* (2006.01)
  *H02B 1/52* (2006.01)
  *H02B 7/06* (2006.01)

(52) U.S. Cl.
  CPC .............. *F04B 17/03* (2013.01); *F04B 35/04* (2013.01); *H02B 1/202* (2013.01); *H02B 1/24* (2013.01); *H02B 1/305* (2013.01); *H02B 1/52* (2013.01); *H02B 7/06* (2013.01); *H02J 2310/40* (2020.01)

(58) Field of Classification Search
  CPC H02B 1/06; H02B 1/202205; H02B 1/24305; H02B 1/52; H02B 7/06; H02J 2310/40; H02J 3/007; H02J 3/06; H02J 3/381; H02J 3/46
  See application file for complete search history.

(56) References Cited

U.S. PATENT DOCUMENTS

| | | |
|---|---|---|
| 1,671,436 A | 5/1928 | Melott |
| 1,743,771 A | 1/1930 | Hall et al. |
| 1,967,466 A | 7/1934 | Damsel |
| 2,004,077 A | 6/1935 | McCartney et al. |
| 2,183,364 A | 12/1939 | Bailey |
| 2,220,622 A | 11/1940 | Homer |
| 2,237,812 A | 4/1941 | De Blieux et al. |
| 2,244,106 A | 6/1941 | Granberg |
| 2,248,051 A | 7/1941 | Armstrong |
| 2,407,796 A | 9/1946 | Page |
| 2,416,848 A | 3/1947 | Stewart |
| 2,610,741 A | 9/1952 | Schmid |
| 2,753,940 A | 7/1956 | Bonner |
| 2,852,600 A | 9/1958 | Jenkins, Jr. |
| 2,976,025 A | 3/1961 | Pro |
| 3,055,682 A | 9/1962 | Bacher et al. |
| 3,061,039 A | 10/1962 | Peters |
| 3,066,503 A | 12/1962 | Fleming et al. |
| 3,116,086 A | 12/1963 | Barengoltz |
| 3,302,069 A | 1/1967 | Webster |
| 3,334,495 A | 8/1967 | Jensen et al. |
| 3,347,570 A | 10/1967 | Roessler |
| 3,722,595 A | 3/1973 | Kiel |
| 3,764,233 A | 10/1973 | Strickland |
| 3,773,140 A | 11/1973 | Mahajan et al. |
| 3,794,846 A | 2/1974 | Schlicher et al. |
| 3,837,179 A | 9/1974 | Barth |
| 3,849,662 A | 11/1974 | Blaskowski et al. |
| 3,878,884 A | 4/1975 | Raleigh |
| 3,881,551 A | 5/1975 | Terry et al. |
| 3,967,841 A | 7/1976 | Kendrick et al. |
| 4,037,431 A | 7/1977 | Sugimoto |
| 4,100,822 A | 7/1978 | Rosman |
| 4,151,575 A | 4/1979 | Hogue |
| 4,226,299 A | 10/1980 | Hansen |
| 4,265,266 A | 5/1981 | Kierbow et al. |
| 4,411,313 A | 10/1983 | Johnson et al. |
| 4,432,064 A | 2/1984 | Barker et al. |
| 4,442,665 A | 4/1984 | Fick et al. |
| 4,456,092 A | 6/1984 | Kubozuka et al. |
| 4,506,982 A | 3/1985 | Smithers et al. |
| 4,512,387 A | 4/1985 | Rodriguez et al. |
| 4,529,887 A | 7/1985 | Johnson |
| 4,538,916 A | 9/1985 | Zimmerman |
| 4,562,360 A | 12/1985 | Fujimoto |
| 4,601,629 A | 7/1986 | Zimmerman |
| 4,676,063 A | 6/1987 | Goebel et al. |
| 4,759,674 A | 7/1988 | Schroder et al. |
| 4,768,884 A | 9/1988 | Elkin |
| 4,783,038 A | 11/1988 | Gilbert et al. |
| 4,793,386 A | 12/1988 | Sloan |
| 4,845,981 A | 7/1989 | Pearson |
| 4,898,473 A | 2/1990 | Stegemoeller et al. |
| 4,922,463 A | 5/1990 | Del Zotto et al. |
| 5,004,400 A | 4/1991 | Handke |
| 5,006,044 A | 4/1991 | Walker, Sr. et al. |
| 5,025,861 A | 6/1991 | Huber et al. |
| 5,050,673 A | 9/1991 | Baldridge |
| 5,114,239 A | 5/1992 | Allen |
| 5,130,628 A | 7/1992 | Owen |
| 5,131,472 A | 7/1992 | Dees et al. |
| 5,172,009 A | 12/1992 | Mohan |
| 5,189,388 A | 2/1993 | Mosley et al. |
| 5,230,366 A | 7/1993 | Marandi |
| 5,293,947 A | 3/1994 | Stratton |
| 5,334,899 A | 8/1994 | Skybyk |
| 5,366,324 A | 11/1994 | Arlt et al. |
| 5,422,550 A | 6/1995 | McClanahan et al. |
| 5,433,243 A | 7/1995 | Griswold et al. |
| 5,439,066 A | 8/1995 | Gipson |
| 5,486,047 A | 1/1996 | Zimmerman |
| 5,517,822 A | 5/1996 | Haws et al. |
| 5,548,093 A | 8/1996 | Sato |
| 5,549,285 A | 8/1996 | Collins |
| 5,590,976 A | 1/1997 | Kilheffer et al. |
| 5,606,853 A | 3/1997 | Birch |
| 5,655,361 A | 8/1997 | Kishi |
| 5,736,838 A | 4/1998 | Dove et al. |
| 5,755,096 A | 5/1998 | Holleyman |
| 5,790,972 A | 8/1998 | Kohlenberger |
| 5,791,636 A | 8/1998 | Loziuk |
| 5,798,596 A | 8/1998 | Lordo |
| 5,813,455 A | 9/1998 | Pratt et al. |
| 5,865,247 A | 2/1999 | Peterson et al. |
| 5,879,137 A | 3/1999 | Yie |
| 5,894,888 A | 4/1999 | Wiemers et al. |
| 5,907,970 A | 6/1999 | Havlovick et al. |
| 5,950,726 A | 9/1999 | Roberts |
| 6,035,265 A | 3/2000 | Dister et al. |
| 6,097,310 A | 8/2000 | Harrell et al. |
| 6,116,040 A | 9/2000 | Stark |
| 6,121,705 A | 9/2000 | Hoong |
| 6,138,764 A | 10/2000 | Scarsdale et al. |
| 6,142,878 A | 11/2000 | Barin |
| 6,164,910 A | 12/2000 | Mayleben |
| 6,202,702 B1 | 3/2001 | Ohira et al. |
| 6,208,098 B1 | 3/2001 | Kume et al. |
| 6,254,462 B1 | 7/2001 | Kelton et al. |
| 6,271,637 B1 | 8/2001 | Kushion |
| 6,273,193 B1 | 8/2001 | Hermann et al. |
| 6,315,523 B1 | 11/2001 | Mills |
| 6,406,011 B1 | 6/2002 | Kosar et al. |
| 6,442,942 B1 | 9/2002 | Kopko |
| 6,477,852 B2 | 11/2002 | Dodo et al. |
| 6,484,490 B1 | 11/2002 | Olsen et al. |
| 6,491,098 B1 | 12/2002 | Dallas |
| 6,510,695 B1 | 1/2003 | Fisher |
| 6,529,135 B1 | 3/2003 | Bowers et al. |
| 6,585,455 B1 | 7/2003 | Petersen et al. |
| 6,626,646 B2 | 9/2003 | Rajewski |
| 6,633,727 B2 | 10/2003 | Henrie et al. |
| 6,719,900 B2 | 4/2004 | Hawkins |
| 6,765,304 B2 | 7/2004 | Baten et al. |
| 6,776,227 B2 | 8/2004 | Beida et al. |
| 6,788,022 B2 | 9/2004 | Sopko et al. |
| 6,802,690 B2 | 10/2004 | Han et al. |
| 6,808,303 B2 | 10/2004 | Fisher |
| 6,837,910 B1 | 1/2005 | Yoshikawa et al. |
| 6,931,310 B2 | 8/2005 | Shimizu et al. |
| 6,936,947 B1 | 8/2005 | Leijon et al. |
| 6,985,750 B1 | 1/2006 | Vicknair et al. |
| 7,082,993 B2 | 8/2006 | Ayoub et al. |
| 7,104,233 B2 | 9/2006 | Ryczek et al. |

(56) References Cited

U.S. PATENT DOCUMENTS

| | | |
|---|---|---|
| 7,170,262 B2 | 1/2007 | Pettigrew |
| 7,173,399 B2 | 2/2007 | Sihler et al. |
| 7,279,655 B2 | 10/2007 | Blutke et al. |
| 7,308,933 B1 | 12/2007 | Mayfield et al. |
| 7,309,835 B2 | 12/2007 | Morrison et al. |
| 7,312,593 B1 | 12/2007 | Streicher et al. |
| 7,336,514 B2 | 2/2008 | Amarillas et al. |
| 7,341,287 B2 | 3/2008 | Gibb et al. |
| 7,445,041 B2 | 11/2008 | O'Brien |
| 7,494,263 B2 | 2/2009 | Dykstra et al. |
| 7,500,642 B2 | 3/2009 | Cunningham et al. |
| 7,525,264 B2 | 4/2009 | Dodge |
| 7,563,076 B2 | 7/2009 | Brunet et al. |
| 7,581,379 B2 | 9/2009 | Yoshida et al. |
| 7,675,189 B2 | 3/2010 | Grenier |
| 7,683,499 B2 | 3/2010 | Saucier |
| 7,717,193 B2 | 5/2010 | Egilsson et al. |
| 7,755,310 B2 | 7/2010 | West et al. |
| 7,770,396 B2 | 8/2010 | Roby et al. |
| 7,795,830 B2 | 9/2010 | Johnson |
| 7,807,048 B2 | 10/2010 | Collette |
| 7,835,140 B2 | 11/2010 | Mori et al. |
| 7,845,413 B2 | 12/2010 | Shampine et al. |
| 7,900,893 B2 | 3/2011 | Teurlay et al. |
| 7,926,562 B2 | 4/2011 | Poitzsch et al. |
| 7,940,039 B2 | 5/2011 | de Buda |
| 7,977,824 B2 | 7/2011 | Halen et al. |
| 7,984,757 B1 | 7/2011 | Keast et al. |
| 8,037,936 B2 | 10/2011 | Neuroth et al. |
| 8,054,084 B2 | 11/2011 | Schulz et al. |
| 8,083,504 B2 | 12/2011 | Williams et al. |
| 8,091,928 B2 | 1/2012 | Carrier et al. |
| 8,096,354 B2 | 1/2012 | Poitzsch et al. |
| 8,096,891 B2 | 1/2012 | Lochtefeld et al. |
| 8,139,383 B2 | 3/2012 | Efraimsson et al. |
| 8,146,665 B2 | 4/2012 | Neal |
| 8,154,419 B2 | 4/2012 | Daussin et al. |
| 8,221,513 B2 | 7/2012 | Ariyapadi et al. |
| 8,232,892 B2 | 7/2012 | Overholt et al. |
| 8,261,528 B2 | 9/2012 | Chillar et al. |
| 8,272,439 B2 | 9/2012 | Strickland |
| 8,310,272 B2 | 11/2012 | Quarto |
| 8,354,817 B2 | 1/2013 | Yeh et al. |
| 8,474,521 B2 | 7/2013 | Kajaria et al. |
| RE44,444 E | 8/2013 | Dole et al. |
| 8,506,267 B2 | 8/2013 | Gambier et al. |
| 8,534,235 B2 | 9/2013 | Chandler |
| 8,556,302 B2 | 10/2013 | Dole |
| 8,573,303 B2 | 11/2013 | Kerfoot |
| 8,596,056 B2 | 12/2013 | Woodmansee et al. |
| 8,616,005 B1 | 12/2013 | Cousino, Sr. |
| 8,616,274 B2 | 12/2013 | Belcher et al. |
| 8,646,521 B2 | 2/2014 | Bowen |
| 8,692,408 B2 | 4/2014 | Zhang et al. |
| 8,727,068 B2 | 5/2014 | Bruin |
| 8,760,657 B2 | 6/2014 | Pope et al. |
| 8,763,387 B2 | 7/2014 | Schmidt |
| 8,774,972 B2 | 7/2014 | Rusnak et al. |
| 8,789,601 B2 | 7/2014 | Broussard et al. |
| 8,795,525 B2 | 8/2014 | McGinnis et al. |
| 8,800,652 B2 | 8/2014 | Bartko et al. |
| 8,807,960 B2 | 8/2014 | Stephenson et al. |
| 8,838,341 B2 | 9/2014 | Kumano |
| 8,851,860 B1 | 10/2014 | Mail |
| 8,857,506 B2 | 10/2014 | Stone, Jr. et al. |
| 8,893,787 B2 | 11/2014 | Tips et al. |
| 8,899,940 B2 | 12/2014 | Laugemors et al. |
| 8,905,056 B2 | 12/2014 | Kendrick |
| 8,905,138 B2 | 12/2014 | Lundstedt et al. |
| 8,997,904 B2 | 4/2015 | Cryer et al. |
| 9,018,881 B2 | 4/2015 | Mao et al. |
| 9,051,822 B2 | 6/2015 | Ayan et al. |
| 9,051,923 B2 | 6/2015 | Kuo |
| 9,061,223 B2 | 6/2015 | Winborn |
| 9,062,545 B2 | 6/2015 | Roberts et al. |
| 9,067,182 B2 | 6/2015 | Nichols et al. |
| 9,103,193 B2 | 8/2015 | Coli et al. |
| 9,119,326 B2 | 8/2015 | McDonnell et al. |
| 9,121,257 B2 | 9/2015 | Coli et al. |
| 9,140,105 B2 | 9/2015 | Pattillo |
| 9,140,110 B2 | 9/2015 | Coli et al. |
| 9,160,168 B2 | 10/2015 | Chapel et al. |
| 9,260,253 B2 | 2/2016 | Naizer et al. |
| 9,322,239 B2 | 4/2016 | Angeles Boza et al. |
| 9,324,049 B2 | 4/2016 | Thomeer et al. |
| 9,340,353 B2 | 5/2016 | Oren et al. |
| 9,353,593 B1 | 5/2016 | Lu et al. |
| 9,366,114 B2 | 6/2016 | Coli et al. |
| 9,410,410 B2 | 8/2016 | Broussard et al. |
| 9,450,385 B2 | 9/2016 | Kristensen |
| 9,475,020 B2 | 10/2016 | Coli et al. |
| 9,475,021 B2 | 10/2016 | Coli et al. |
| 9,475,840 B2 | 10/2016 | Lledó et al. |
| 9,482,086 B2 | 11/2016 | Richardson et al. |
| 9,499,335 B2 | 11/2016 | McIver et al. |
| 9,506,333 B2 | 11/2016 | Castillo et al. |
| 9,513,055 B1 | 12/2016 | Seal |
| 9,534,473 B2 | 1/2017 | Morris et al. |
| 9,562,420 B2 | 2/2017 | Morris et al. |
| 9,587,649 B2 | 3/2017 | Oehring |
| 9,611,728 B2 | 4/2017 | Oehring |
| 9,650,871 B2 | 5/2017 | Oehring et al. |
| 9,650,879 B2 | 5/2017 | Broussard et al. |
| 9,706,185 B2 | 7/2017 | Ellis |
| 9,728,354 B2 | 8/2017 | Skolozdra et al. |
| 9,738,461 B2 | 8/2017 | DeGaray et al. |
| 9,739,546 B2 | 8/2017 | Bertilsson et al. |
| 9,745,840 B2 | 8/2017 | Oehring et al. |
| 9,790,858 B2 | 10/2017 | Kanebako |
| 9,840,901 B2 | 12/2017 | Oehring et al. |
| 9,863,228 B2 | 1/2018 | Shampine et al. |
| 9,893,500 B2 | 2/2018 | Oehring et al. |
| 9,903,190 B2 | 2/2018 | Conrad et al. |
| 9,909,398 B2 | 3/2018 | Pham |
| 9,915,128 B2 | 3/2018 | Hunter |
| 9,932,799 B2 | 4/2018 | Symchuk |
| 9,945,365 B2 | 4/2018 | Hernandez et al. |
| 9,963,961 B2 | 5/2018 | Hardin |
| 9,970,278 B2 | 5/2018 | Broussard et al. |
| 9,976,351 B2 | 5/2018 | Randall |
| 9,995,218 B2 | 6/2018 | Oehring et al. |
| 10,008,880 B2 | 6/2018 | Vicknair et al. |
| 10,020,711 B2 | 7/2018 | Oehring et al. |
| 10,036,238 B2 | 7/2018 | Oehring |
| 10,107,086 B2 | 10/2018 | Oehring |
| 10,119,381 B2 | 11/2018 | Oehring et al. |
| 10,184,465 B2 | 1/2019 | Enis et al. |
| 10,196,878 B2 | 2/2019 | Hunter |
| 10,221,639 B2 | 3/2019 | Romer et al. |
| 10,227,854 B2 | 3/2019 | Glass |
| 10,232,332 B2 | 3/2019 | Oehring et al. |
| 10,246,984 B2 | 4/2019 | Payne et al. |
| 10,254,732 B2 | 4/2019 | Oehring et al. |
| 10,260,327 B2 | 4/2019 | Kajaria et al. |
| 10,280,724 B2 | 5/2019 | Hinderliter |
| 10,287,873 B2 | 5/2019 | Filas et al. |
| 10,302,079 B2 | 5/2019 | Kendrick |
| 10,309,205 B2 | 6/2019 | Randall |
| 10,337,308 B2 | 7/2019 | Broussard et al. |
| 10,371,012 B2 | 8/2019 | Davis et al. |
| 10,378,326 B2 | 8/2019 | Morris et al. |
| 10,393,108 B2 | 8/2019 | Chong et al. |
| 10,407,990 B2 | 9/2019 | Oehring et al. |
| 10,408,030 B2 | 9/2019 | Oehring et al. |
| 10,408,031 B2 | 9/2019 | Oehring et al. |
| 10,415,332 B2 | 9/2019 | Morris et al. |
| 10,436,026 B2 | 10/2019 | Ounadjela et al. |
| 10,526,882 B2 | 1/2020 | Oehring et al. |
| 10,627,003 B2 | 4/2020 | Dale et al. |
| 10,648,270 B2 | 5/2020 | Brunty et al. |
| 10,648,311 B2 | 5/2020 | Oehring et al. |
| 10,669,471 B2 | 6/2020 | Schmidt et al. |
| 10,669,804 B2 | 6/2020 | Kotrla et al. |
| 10,686,301 B2 | 6/2020 | Oehring et al. |

(56) References Cited

U.S. PATENT DOCUMENTS

| | | |
|---|---|---|
| 10,690,131 B2 | 6/2020 | Rashid et al. |
| 10,695,950 B2 | 6/2020 | Igo et al. |
| 10,711,576 B2 | 7/2020 | Bishop |
| 10,731,561 B2 | 8/2020 | Oehring et al. |
| 10,740,730 B2 | 8/2020 | Altamirano et al. |
| 10,767,561 B2 | 9/2020 | Brady |
| 10,781,752 B2 | 9/2020 | Kikkawa et al. |
| 10,794,165 B2 | 10/2020 | Fischer et al. |
| 10,914,155 B2 | 2/2021 | Oehring et al. |
| 10,934,824 B2 | 3/2021 | Oehring et al. |
| 10,988,998 B2 | 4/2021 | Fischer et al. |
| 11,091,992 B2 | 8/2021 | Broussard et al. |
| 11,208,878 B2 | 12/2021 | Oehring et al. |
| 11,359,462 B2 | 6/2022 | Morris et al. |
| 11,451,016 B2 | 9/2022 | Oehring et al. |
| 11,578,577 B2 * | 2/2023 | Hinderliter ............. H02B 1/24 |
| 12,027,831 B2 * | 7/2024 | Oehring ............. E21B 43/2607 |
| 2001/0000996 A1 | 5/2001 | Grimland et al. |
| 2002/0169523 A1 | 11/2002 | Ross et al. |
| 2003/0056514 A1 | 3/2003 | Lohn |
| 2003/0057704 A1 | 3/2003 | Baten et al. |
| 2003/0079875 A1 | 5/2003 | Weng |
| 2003/0138327 A1 | 7/2003 | Jones et al. |
| 2004/0040746 A1 | 3/2004 | Niedermayr et al. |
| 2004/0045703 A1 | 3/2004 | Hooper et al. |
| 2004/0102109 A1 | 5/2004 | Cratty et al. |
| 2004/0167738 A1 | 8/2004 | Miller |
| 2004/0212679 A1 | 10/2004 | Jun |
| 2005/0061548 A1 | 3/2005 | Hooper et al. |
| 2005/0116541 A1 | 6/2005 | Seiver |
| 2005/0201197 A1 | 9/2005 | Duell et al. |
| 2005/0274508 A1 | 12/2005 | Folk et al. |
| 2006/0052903 A1 | 3/2006 | Bassett |
| 2006/0065319 A1 | 3/2006 | Csitari |
| 2006/0109141 A1 | 5/2006 | Huang et al. |
| 2007/0125544 A1 | 6/2007 | Robinson et al. |
| 2007/0131410 A1 | 6/2007 | Hill et al. |
| 2007/0187163 A1 | 8/2007 | Cone et al. |
| 2007/0201305 A1 | 8/2007 | Heilman et al. |
| 2007/0226089 A1 | 9/2007 | DeGaray et al. |
| 2007/0277982 A1 | 12/2007 | Shampine et al. |
| 2007/0278140 A1 | 12/2007 | Mallet et al. |
| 2008/0017369 A1 | 1/2008 | Sarada |
| 2008/0041596 A1 | 2/2008 | Blount et al. |
| 2008/0095644 A1 | 4/2008 | Mantei et al. |
| 2008/0112802 A1 | 5/2008 | Orlando et al. |
| 2008/0137266 A1 | 6/2008 | Jensen et al. |
| 2008/0142304 A1 | 6/2008 | Schutz et al. |
| 2008/0164023 A1 | 7/2008 | Dykstra et al. |
| 2008/0208478 A1 | 8/2008 | Ella et al. |
| 2008/0217024 A1 | 9/2008 | Moore |
| 2008/0236818 A1 | 10/2008 | Dykstra |
| 2008/0257449 A1 | 10/2008 | Weinstein et al. |
| 2008/0264625 A1 | 10/2008 | Ochoa |
| 2008/0264649 A1 | 10/2008 | Crawford |
| 2008/0277120 A1 | 11/2008 | Hickie |
| 2008/0288115 A1 | 11/2008 | Rusnak |
| 2009/0045782 A1 | 2/2009 | Datta et al. |
| 2009/0065299 A1 | 3/2009 | Vito et al. |
| 2009/0068031 A1 | 3/2009 | Gambier et al. |
| 2009/0072645 A1 | 3/2009 | Quere |
| 2009/0078410 A1 | 3/2009 | Krenek et al. |
| 2009/0093317 A1 | 4/2009 | Kajiwara et al. |
| 2009/0095482 A1 | 4/2009 | Surjaatmadja |
| 2009/0114392 A1 | 5/2009 | Tolman et al. |
| 2009/0122578 A1 | 5/2009 | Beltran |
| 2009/0145611 A1 | 6/2009 | Pallini, Jr. et al. |
| 2009/0153354 A1 | 6/2009 | Daussin et al. |
| 2009/0188181 A1 | 7/2009 | Forbis et al. |
| 2009/0200035 A1 | 8/2009 | Bjerkreim et al. |
| 2009/0200290 A1 | 8/2009 | Cardinal et al. |
| 2009/0260826 A1 | 10/2009 | Sherwood et al. |
| 2009/0308602 A1 | 12/2009 | Bruins et al. |
| 2009/0315297 A1 | 12/2009 | Nadeau et al. |
| 2010/0000508 A1 | 1/2010 | Chandler |
| 2010/0019574 A1 | 1/2010 | Baldassarre et al. |
| 2010/0038907 A1 | 2/2010 | Hunt et al. |
| 2010/0045109 A1 | 2/2010 | Arnold |
| 2010/0051272 A1 | 3/2010 | Loree et al. |
| 2010/0132949 A1 | 6/2010 | DeFosse et al. |
| 2010/0146981 A1 | 6/2010 | Motakef et al. |
| 2010/0172202 A1 | 7/2010 | Borgstadt |
| 2010/0193057 A1 | 8/2010 | Garner et al. |
| 2010/0250139 A1 | 9/2010 | Hobbs et al. |
| 2010/0281876 A1 | 11/2010 | Khan et al. |
| 2010/0293973 A1 | 11/2010 | Erickson |
| 2010/0303655 A1 | 12/2010 | Scekic |
| 2010/0322802 A1 | 12/2010 | Kugelev |
| 2011/0005757 A1 | 1/2011 | Hebert |
| 2011/0017468 A1 | 1/2011 | Birch et al. |
| 2011/0042387 A1 | 2/2011 | Henry et al. |
| 2011/0052423 A1 | 3/2011 | Gambier et al. |
| 2011/0061855 A1 | 3/2011 | Case et al. |
| 2011/0063942 A1 | 3/2011 | Hagan et al. |
| 2011/0081268 A1 | 4/2011 | Ochoa et al. |
| 2011/0085924 A1 | 4/2011 | Shampine et al. |
| 2011/0097988 A1 | 4/2011 | Lord |
| 2011/0110793 A1 | 5/2011 | Leugemores et al. |
| 2011/0166046 A1 | 7/2011 | Weaver et al. |
| 2011/0175397 A1 | 7/2011 | Amrine, Jr. et al. |
| 2011/0197988 A1 | 8/2011 | Van Vliet et al. |
| 2011/0241590 A1 | 10/2011 | Horikoshi et al. |
| 2011/0247878 A1 | 10/2011 | Rasheed |
| 2011/0272158 A1 | 11/2011 | Neal |
| 2012/0018016 A1 | 1/2012 | Gibson et al. |
| 2012/0049625 A1 | 3/2012 | Hopwood |
| 2012/0063936 A1 | 3/2012 | Baxter et al. |
| 2012/0085541 A1 | 4/2012 | Love et al. |
| 2012/0111560 A1 | 5/2012 | Hill et al. |
| 2012/0112757 A1 | 5/2012 | Vrankovic et al. |
| 2012/0127635 A1 | 5/2012 | Grindeland |
| 2012/0150455 A1 | 6/2012 | Franklin et al. |
| 2012/0152716 A1 | 6/2012 | Kikukawa et al. |
| 2012/0205301 A1 | 8/2012 | McGuire et al. |
| 2012/0205400 A1 | 8/2012 | DeGaray et al. |
| 2012/0217067 A1 | 8/2012 | Mebane, III et al. |
| 2012/0222865 A1 | 9/2012 | Larson et al. |
| 2012/0232728 A1 | 9/2012 | Karimi et al. |
| 2012/0247783 A1 | 10/2012 | Berner, Jr. et al. |
| 2012/0255734 A1 | 10/2012 | Coli et al. |
| 2013/0009469 A1 | 1/2013 | Gillett |
| 2013/0025706 A1 | 1/2013 | DeGaray et al. |
| 2013/0051971 A1 | 2/2013 | Wyse et al. |
| 2013/0078114 A1 | 3/2013 | Van Rijswick et al. |
| 2013/0138254 A1 | 5/2013 | Seals et al. |
| 2013/0175038 A1 | 7/2013 | Conrad |
| 2013/0175039 A1 | 7/2013 | Guidry |
| 2013/0180722 A1 | 7/2013 | Caro et al. |
| 2013/0189629 A1 | 7/2013 | Chandler |
| 2013/0199617 A1 | 8/2013 | DeGaray et al. |
| 2013/0233542 A1 | 9/2013 | Shampine et al. |
| 2013/0255271 A1 | 10/2013 | Yu et al. |
| 2013/0284278 A1 | 10/2013 | Winborn |
| 2013/0284455 A1 | 10/2013 | Kajaria et al. |
| 2013/0299167 A1 | 11/2013 | Fordyce et al. |
| 2013/0306322 A1 | 11/2013 | Sanborn et al. |
| 2013/0317750 A1 | 11/2013 | Hunter |
| 2013/0341029 A1 | 12/2013 | Roberts et al. |
| 2013/0343858 A1 | 12/2013 | Flusche |
| 2014/0000899 A1 | 1/2014 | Nevison |
| 2014/0010671 A1 | 1/2014 | Cryer et al. |
| 2014/0048255 A1 | 2/2014 | Baca et al. |
| 2014/0054965 A1 | 2/2014 | Jain |
| 2014/0060658 A1 | 3/2014 | Hains et al. |
| 2014/0077607 A1 | 3/2014 | Clarke et al. |
| 2014/0095114 A1 | 4/2014 | Thomeer et al. |
| 2014/0096974 A1 | 4/2014 | Coli et al. |
| 2014/0124162 A1 | 5/2014 | Leavitt |
| 2014/0138079 A1 | 5/2014 | Broussard et al. |
| 2014/0158345 A1 | 6/2014 | Jang et al. |
| 2014/0174717 A1 | 6/2014 | Broussard et al. |
| 2014/0219824 A1 | 8/2014 | Burnette |
| 2014/0238683 A1 | 8/2014 | Korach et al. |
| 2014/0246211 A1 | 9/2014 | Guidry et al. |

(56) References Cited

U.S. PATENT DOCUMENTS

| | | |
|---|---|---|
| 2014/0251623 A1 | 9/2014 | Lestz et al. |
| 2014/0255214 A1 | 9/2014 | Burnette |
| 2014/0273128 A1 | 9/2014 | Coleman et al. |
| 2014/0277772 A1 | 9/2014 | Lopez et al. |
| 2014/0290768 A1 | 10/2014 | Rendle et al. |
| 2014/0294603 A1 | 10/2014 | Best |
| 2014/0379300 A1 | 12/2014 | Devine et al. |
| 2015/0027712 A1 | 1/2015 | Vicknair et al. |
| 2015/0038021 A1 | 2/2015 | Gilliam |
| 2015/0053426 A1 | 2/2015 | Smith et al. |
| 2015/0068724 A1 | 3/2015 | Coli et al. |
| 2015/0068754 A1 | 3/2015 | Coli et al. |
| 2015/0075778 A1 | 3/2015 | Walters et al. |
| 2015/0083426 A1 | 3/2015 | Lesko et al. |
| 2015/0097504 A1 | 4/2015 | Lamascus et al. |
| 2015/0114652 A1 | 4/2015 | Lestz et al. |
| 2015/0136043 A1 | 5/2015 | Shaaban et al. |
| 2015/0144336 A1 | 5/2015 | Hardin et al. |
| 2015/0147194 A1 | 5/2015 | Foote |
| 2015/0159911 A1 | 6/2015 | Holt |
| 2015/0175013 A1 | 6/2015 | Cryer et al. |
| 2015/0176386 A1 | 6/2015 | Castillo et al. |
| 2015/0211512 A1 | 7/2015 | Wiegman et al. |
| 2015/0211524 A1 | 7/2015 | Broussard et al. |
| 2015/0217672 A1 | 8/2015 | Shampine et al. |
| 2015/0225113 A1 | 8/2015 | Lungu et al. |
| 2015/0233530 A1 | 8/2015 | Sandidge |
| 2015/0252661 A1 | 9/2015 | Glass |
| 2015/0300145 A1 | 10/2015 | Coli et al. |
| 2015/0300336 A1 | 10/2015 | Hernandez et al. |
| 2015/0314225 A1 | 11/2015 | Coli et al. |
| 2015/0330172 A1 | 11/2015 | Allmaras et al. |
| 2015/0354322 A1 | 12/2015 | Vicknair |
| 2016/0006311 A1 | 1/2016 | Li |
| 2016/0032703 A1 | 2/2016 | Broussard et al. |
| 2016/0102537 A1 | 4/2016 | Lopez |
| 2016/0105022 A1 | 4/2016 | Oehring et al. |
| 2016/0160889 A1 | 6/2016 | Hoffman et al. |
| 2016/0177675 A1 | 6/2016 | Morris et al. |
| 2016/0177678 A1 | 6/2016 | Morris et al. |
| 2016/0186531 A1 | 6/2016 | Harkless et al. |
| 2016/0208592 A1 | 7/2016 | Oehring |
| 2016/0208593 A1 | 7/2016 | Coli et al. |
| 2016/0208594 A1 | 7/2016 | Coli et al. |
| 2016/0208595 A1 | 7/2016 | Tang et al. |
| 2016/0221220 A1 | 8/2016 | Paige |
| 2016/0230524 A1 | 8/2016 | Dumoit et al. |
| 2016/0230525 A1 | 8/2016 | Lestz et al. |
| 2016/0230660 A1 | 8/2016 | Zeitoun et al. |
| 2016/0258267 A1 | 9/2016 | Payne et al. |
| 2016/0265457 A1 | 9/2016 | Stephenson et al. |
| 2016/0273328 A1 | 9/2016 | Oehring |
| 2016/0273456 A1 | 9/2016 | Zhang et al. |
| 2016/0281484 A1 | 9/2016 | Lestz et al. |
| 2016/0290114 A1 | 10/2016 | Oehring et al. |
| 2016/0312108 A1 | 10/2016 | Diggns |
| 2016/0319649 A1 | 11/2016 | Oehring |
| 2016/0319650 A1 | 11/2016 | Oehring et al. |
| 2016/0326853 A1 | 11/2016 | Fredd et al. |
| 2016/0326854 A1 | 11/2016 | Broussard et al. |
| 2016/0326855 A1 | 11/2016 | Coli et al. |
| 2016/0341281 A1 | 11/2016 | Brunvold et al. |
| 2016/0348479 A1 | 12/2016 | Oehring et al. |
| 2016/0349728 A1 | 12/2016 | Oehring et al. |
| 2016/0369609 A1 | 12/2016 | Morris et al. |
| 2017/0016433 A1 | 1/2017 | Chong et al. |
| 2017/0021318 A1 | 1/2017 | McIver et al. |
| 2017/0022788 A1 | 1/2017 | Oehring et al. |
| 2017/0022807 A1 | 1/2017 | Dursun et al. |
| 2017/0028368 A1 | 2/2017 | Oehring et al. |
| 2017/0030177 A1 | 2/2017 | Oehring et al. |
| 2017/0030178 A1 | 2/2017 | Oehring et al. |
| 2017/0036178 A1 | 2/2017 | Coli et al. |
| 2017/0036872 A1 | 2/2017 | Wallace et al. |
| 2017/0037717 A1 | 2/2017 | Oehring et al. |
| 2017/0037718 A1 | 2/2017 | Coli et al. |
| 2017/0043280 A1 | 2/2017 | Vankouwenberg |
| 2017/0051732 A1 | 2/2017 | Hemandez et al. |
| 2017/0074076 A1 | 3/2017 | Joseph et al. |
| 2017/0082033 A1 | 3/2017 | Wu et al. |
| 2017/0096885 A1 | 4/2017 | Oehring et al. |
| 2017/0096889 A1 | 4/2017 | Blanckaert et al. |
| 2017/0104389 A1 | 4/2017 | Morris et al. |
| 2017/0114625 A1 | 4/2017 | Norris et al. |
| 2017/0130743 A1 | 5/2017 | Anderson |
| 2017/0138171 A1 | 5/2017 | Richards et al. |
| 2017/0145918 A1 | 5/2017 | Oehring et al. |
| 2017/0146189 A1 | 5/2017 | Herman et al. |
| 2017/0159570 A1 | 6/2017 | Bickert |
| 2017/0159654 A1 | 6/2017 | Kendrick |
| 2017/0175516 A1 | 6/2017 | Eslinger |
| 2017/0204852 A1 | 7/2017 | Barnett, Jr. |
| 2017/0212535 A1 | 7/2017 | Shelman et al. |
| 2017/0218727 A1 | 8/2017 | Oehring et al. |
| 2017/0218843 A1 | 8/2017 | Oehring et al. |
| 2017/0222409 A1 | 8/2017 | Oehring et al. |
| 2017/0226838 A1 | 8/2017 | Ciezobka et al. |
| 2017/0226839 A1 | 8/2017 | Broussard et al. |
| 2017/0226842 A1 | 8/2017 | Omont et al. |
| 2017/0234250 A1 | 8/2017 | Janik et al. |
| 2017/0241221 A1 | 8/2017 | Seshadri et al. |
| 2017/0259227 A1 | 9/2017 | Morris et al. |
| 2017/0292513 A1 | 10/2017 | Haddad et al. |
| 2017/0313499 A1 | 11/2017 | Hughes et al. |
| 2017/0314380 A1 | 11/2017 | Oehring et al. |
| 2017/0314979 A1 | 11/2017 | Ye et al. |
| 2017/0328179 A1 | 11/2017 | Dykstra et al. |
| 2017/0369258 A1 | 12/2017 | DeGaray et al. |
| 2017/0370639 A1 | 12/2017 | Bardon et al. |
| 2018/0028992 A1 | 2/2018 | Stegemoeller et al. |
| 2018/0038216 A1 | 2/2018 | Zhang et al. |
| 2018/0045331 A1 | 2/2018 | Lopez et al. |
| 2018/0090914 A1 | 3/2018 | Johnson et al. |
| 2018/0156210 A1 | 6/2018 | Oehring et al. |
| 2018/0181830 A1 | 6/2018 | Luharuka et al. |
| 2018/0183219 A1 | 6/2018 | Oehring et al. |
| 2018/0216455 A1 | 8/2018 | Andreychuk et al. |
| 2018/0238147 A1 | 8/2018 | Shahri et al. |
| 2018/0245428 A1 | 8/2018 | Richards |
| 2018/0258746 A1 | 9/2018 | Broussard et al. |
| 2018/0259080 A1 | 9/2018 | Dale et al. |
| 2018/0266217 A1 | 9/2018 | Funkhauser et al. |
| 2018/0266412 A1 | 9/2018 | Stokkevag et al. |
| 2018/0274446 A1 | 9/2018 | Oehring et al. |
| 2018/0284817 A1 | 10/2018 | Cook et al. |
| 2018/0291713 A1 | 10/2018 | Jeanson |
| 2018/0298731 A1 | 10/2018 | Bishop |
| 2018/0312738 A1 | 11/2018 | Rutsch et al. |
| 2018/0313677 A1 | 11/2018 | Warren et al. |
| 2018/0320483 A1 | 11/2018 | Zhang et al. |
| 2018/0343125 A1 | 11/2018 | Clish et al. |
| 2018/0363437 A1 | 12/2018 | Coli et al. |
| 2018/0363640 A1 | 12/2018 | Kajita et al. |
| 2018/0366950 A1 | 12/2018 | Pedersen et al. |
| 2019/0003329 A1 | 1/2019 | Morris et al. |
| 2019/0010793 A1 | 1/2019 | Hinderliter |
| 2019/0011066 A1 | 1/2019 | Ungchusri et al. |
| 2019/0040727 A1 | 2/2019 | Oehring et al. |
| 2019/0063309 A1 | 2/2019 | Davis |
| 2019/0100989 A1 | 4/2019 | Stewart et al. |
| 2019/0112910 A1 | 4/2019 | Oehring et al. |
| 2019/0119096 A1 | 4/2019 | Haile et al. |
| 2019/0120024 A1 | 4/2019 | Oehring et al. |
| 2019/0128080 A1 | 5/2019 | Ross et al. |
| 2019/0128104 A1 | 5/2019 | Graham et al. |
| 2019/0145251 A1 | 5/2019 | Johnson |
| 2019/0154020 A1 | 5/2019 | Glass |
| 2019/0162061 A1 | 5/2019 | Stephenson |
| 2019/0169971 A1 | 6/2019 | Oehring et al. |
| 2019/0178057 A1 | 6/2019 | Hunter |
| 2019/0178235 A1 | 6/2019 | Coskrey et al. |
| 2019/0203567 A1 | 7/2019 | Ross et al. |
| 2019/0203572 A1 | 7/2019 | Morris et al. |
| 2019/0211661 A1 | 7/2019 | Reckels et al. |

(56) References Cited

U.S. PATENT DOCUMENTS

| | | |
|---|---|---|
| 2019/0226317 A1 | 7/2019 | Payne et al. |
| 2019/0245348 A1 | 8/2019 | Hinderliter et al. |
| 2019/0249527 A1 | 8/2019 | Kraynek |
| 2019/0257462 A1 | 8/2019 | Rogers |
| 2019/0292866 A1 | 9/2019 | Ross et al. |
| 2019/0292891 A1 | 9/2019 | Kajaria et al. |
| 2019/0316447 A1 | 10/2019 | Oehring et al. |
| 2019/0383123 A1 | 12/2019 | Hinderliter |
| 2020/0040878 A1 | 2/2020 | Morris |
| 2020/0047141 A1 | 2/2020 | Oehring et al. |
| 2020/0088152 A1 | 3/2020 | Allion et al. |
| 2020/0232454 A1 | 7/2020 | Chretien et al. |
| 2020/0325760 A1 | 10/2020 | Markham |
| 2020/0350790 A1 | 11/2020 | Luft et al. |
| 2021/0032961 A1 | 2/2021 | Hinderliter et al. |
| 2021/0131248 A1 | 5/2021 | Hinderliter et al. |
| 2022/0029391 A1 | 1/2022 | Ough |

FOREIGN PATENT DOCUMENTS

| | | |
|---|---|---|
| CA | 2707269 A1 | 12/2010 |
| CA | 2797081 A1 | 11/2011 |
| CA | 3050131 A1 | 11/2011 |
| CA | 2955706 A1 | 10/2012 |
| CA | 2966672 A1 | 10/2012 |
| CA | 2849825 A1 | 4/2013 |
| CA | 3000322 A1 | 4/2013 |
| CA | 2787814 A1 | 2/2014 |
| CA | 2833711 A1 | 5/2014 |
| CA | 2919666 A1 | 8/2016 |
| CA | 2978706 A1 | 9/2016 |
| CA | 2944980 A1 | 4/2017 |
| CA | 2945579 A1 | 4/2017 |
| CA | 3006422 A1 | 6/2017 |
| CA | 3018485 A1 | 8/2017 |
| CA | 2964593 A1 | 10/2017 |
| CA | 3067854 A1 | 1/2019 |
| CA | 2919649 A1 | 2/2019 |
| CN | 101977016 A | 2/2011 |
| CN | 104117308 A | 10/2014 |
| CN | 104196613 A | 12/2014 |
| CN | 205986303 U | 2/2017 |
| CN | 108049999 A | 5/2018 |
| CN | 112196508 A | 1/2021 |
| JP | 2004264589 A | 9/2004 |
| WO | 0047893 A1 | 8/2000 |
| WO | 2007055587 A1 | 5/2007 |
| WO | 2009046280 A1 | 4/2009 |
| WO | 2012051705 A1 | 4/2012 |
| WO | 201411676 A1 | 7/2014 |
| WO | 2014105642 A1 | 7/2014 |
| WO | 2014177346 A1 | 11/2014 |
| WO | 2016144939 A1 | 9/2016 |
| WO | 2016160458 A1 | 10/2016 |
| WO | 2018044307 A1 | 3/2018 |
| WO | 2018213925 A1 | 11/2018 |
| WO | 2019210417 A1 | 11/2019 |

OTHER PUBLICATIONS

"Swivel Joint," Jereh, Yantal Jereh Petroleum Equipment & Technologies Co. Ltd., printed Dec. 1, 2022, 14 pages.
Camara, "Electrical Engineering Reference Manual for the Electrical and Computer PE Exam—Sixth Edition," Professional Publications, Inc., ISBN: 1-888577-56-8, 2002, 50 pages.
"Comprehensive Power, Power It Up," Technical Presentation, Feb. 27, 2013 (available at: https://www.slideshare.net/jeffsable/comprehensive-power-introduction-oct2013?from_action=save), 28 pages.
"Comprehensive Power, Power It Up," Technical Presentation, Oct. 3, 2013 (available at: https://www.slideshare.net/jeffsable/comprehensive-power-introduction-oct2013?from_action=save), 26 pages.
"American National Standard—Motors and Generators," ANSI/NEMA MG 1, 2011, 636 pages.
"IEEE Standard for Petroleum and Chemical Industry—Premium-Efficiency, Severe-Duty, Totally Enclosed Fan-Cooled (TEFC) Squirrel Cage Induction Motors—Up to and Including 370 KW (500 hp)," IEEE, 2009, 32 pages.
Cary et al., "Electric Rotating Machine Standards Part II: Magnetic Wedge Design & Monitoring Methods," IEEE, Paper No. PCIC-2011-41, 2011, 8 pages.
Bogh et al., "A User's Guide to Factory Testing of Large Motors: What Should Your Witness Expect?," IEEE, Paper No. PCIC-, 2009, 8 pages.
Lockley et al., "What Do the API Motor/Generator Features Cost and What Do They Buy You?," IEEE, Paper No. PCIC-2010-22, 2010, 10 pages.
Malinowski et al., "Petrochemical standards a comparison between IEEE 841-2001, API 541 and API 547," IEEE, Paper No. PCIC-2004-22, 2004, 8 pages.
"Reinventing the Frac Fleet," Clean Fleet, WhisperFrac Reducing Noise and Vibrations, 2018, 2 pages.
"MEC's Mobile Electric Centers for Voltages up to 36kV," ABB, printed 2021, 2 pages.
"Prefabricated Electric Centers (PEC)—Mobile Electric Centers (MEC)," ABB, 2017, 14 pages.
"Mobile Substations on wheels," ABB, 2022, 4 pages.
"Benefits of Using Mobile Transformers and Mobile Substations for Rapidly Restoring Electrical Service," U.S. Department of Energy, Aug. 2006, 48 pages.
"The Evolution of the Modern Substation," Primera, 2022, 4 pages.
Hanna et al., "Medium-Voltage Adjustable-Speed Drives—Users' and Manufacturers' Experiences," IEEE Transactions on Industry Applications, vol. 33, No. 6, Nov./Dec. 1997, 9 pages.
"IEEE 100: The Authoritative Dictionary of IEEE Standards Terms, Seventh Edition," IEEE Press, 2000, ISBN: 0-7381-2601-2, 7 pages.
"Adjustable Speed Electrical Power Drive Systems—Part 4: General Requirements—Rating Specifications for A.C. Power Drive Systems Above 1000 V A.C. and Not Exceeding 35 KV," National Electrical Manufacturers Association (NEMA) Standards Publication ICS 61800-4, 2004, 139 pages.
Roe, "Practices and Procedures of Industrial Electrical Design," McGraw-Hill, 1972, ISBN: 0-07-053390-3, 17 pages.
Oehring et al., U.S. Appl. No. 62/242,173, 2015, 17 pages.
Samsung All-In-One Security System, Quick Start Guide Kit Model SDHC5100, printed 2022, 11 pages.
Amazon.com listing for Samsung SDH-C5100 16 Channel 720p HD DVR Video Security System, 2015, 2 pages.
Amazon.com listing for Amcrest ProHD Wireless IP Security Camera, 2015, 8 pages.
Amazon.com listing for Security & Surveillance Cameras, 2015, 6 pages.
Stewart, "Extracting the Digit!! Time for an ROV Electronics Shake-Up?," Kongsberg Simrad Ltd, UTI, 1997, 10 pages.
Martin et al., "Lessons Learned from 27 Years' Experience of Stimulation Vessel Design and Operation—a Case Study," SPE 166243, 2013, 12 pages.
Maddox, "Visualizing Production in Flowing Oil Wells," Halliburton Energy Services, SPWLA 37th Annual Logging Symposium, Jun. 16-19, 1996, 6 pages.
Cooper et al., "The First Purpose-Built Stimulation Vessel for North Sea Application," Dowell Schlumberger, Society of Petroleum Engineers of AIME, SPE 12993, 1984, 7 pages.
Talley, "Development of a Closed Circuit TV Borehole Probe," Design Engineering Laboratories, Inc., Contract H0308041, Sep. 1984, 22 pages.
Smith et al., "Fracture Width-Design vs. Measurement," Amoco Production Co., Society of Petroleum Engineers of AIME, SPE 10965, 1982, 9 pages.
Hurst et al., "Development and Application of 'Frac' Treatments in the Permian Basin," SPE 405-G, vol. 204, 1955, 8 pages.
Briggs, "Development of a Downhole Television Camera," Oceanographic Engineering Corporation, 1964, 1 page.
IPIECA About Us p. 2015, 1 page.

(56) References Cited

OTHER PUBLICATIONS

Appl et al., "A Viewing Lens for High Pressure Applications," Society of Petroleum Engineers of AIME, SPE-299, 1962, 7 pages.
Taylor, "Efficiency: Watchword of the Oil Industry," Financial Analysts Journal, 2018, 4 pages.
Pritchard, "U.S. Color Television Fundamentals: A Review," SMPTE Journal, Nov. 1977, vol. 86, 10 pages.
Moxastore website, listing for NPORTIA5250, 2015, 2 pages.
Moxastore website, About US, 2015, 1 page.
Moxastore website, Homepage, 2015, 2 pages.
Moxastore website, listing for Moxa 802.11 Ethernet to Serial, 2016, 1 page.
Amazon.com listing for Global Cache iTach, IP to Serial with PoE (IP2SL-P) by Global Cach, 2014, 3 pages.
Amazon.com listing for SainSmart TCP/IP Ethernet to Serial RS232 RS485 Intelligent Communication Converter by SainSmart, 2014, 4 pages.
Amazon.com listing for TCP/IP Ethernet to Serial RS232 RS485 RS422 Converter by Atc, 2014, 2 pages.
Amazon.com listing for StarTech.com 1 Port RS232 Serial to IP Ethernet Converter (NETRS2321P) by StarTech, 2014, 4 pages.
Amazon.com listing for StarTech NETRS2321E 1 Port RS-232/422/485 Serial over IP Ethernet Device Server by StarTech, 2014, 4 pages.
Osha-Niosh Hazard Alert: Worker Exposure to Silica during Hydraulic Fracturing, U.S. Department of Labor, 2012, 15 pages.
Avallone et al., "Marks Standard Handbook for Mechanical Engineers 11th Edition," McGraw-Hill, 2007, 5 pages.
Fink, "Standard Handbook for Electrical Engineers," Thirteenth Edition, McGraw-Hill, ISBN: 0-07-020984-7, 7 pages (excerpts) (Part 1).
Fink, "Standard Handbook for Electrical Engineers," Thirteenth Edition, McGraw-Hill, ISBN: 0-07-020984-7, 7 pages (excerpts) (Part 2).
Fink, "Standard Handbook for Electrical Engineers," Thirteenth Edition, McGraw-Hill, ISBN: 0-07-020984-7, 6 pages (excerpts) (Part 3).
Roe, "Practices and Procedures of Industrial Electrical Design," McGraw-Hill, 1972, ISBN: 0-07-053390-3, 14 pages (Part 1).
Roe, "Practices and Procedures of Industrial Electrical Design," McGraw-Hill, 1972, ISBN: 0-07-053390-3, 11 pages (Part 2).
Camara, "Electrical Engineering Reference Manual for the Electrical and Computer PE Exam—Sixth Edition," Professional Publications, Inc., ISBN: 1-888577-56-8, 2002, 17 pages (Part 1).
Camara, "Electrical Engineering Reference Manual for the Electrical and Computer PE Exam—Sixth Edition," Professional Publications, Inc., ISBN: 1-888577-56-8, 2002, 25 pages (Part 2).
Camara, "Electrical Engineering Reference Manual for the Electrical and Computer PE Exam—Sixth Edition," Professional Publications, Inc., ISBN: 1-888577-56-8, 2002, 20 pages (Part 3).
Camara, "Electrical Engineering Reference Manual for the Electrical and Computer PE Exam—Sixth Edition," Professional Publications, Inc., ISBN: 1-888577-56-8, 2002, 19 pages (Part 4).
Camara, "Electrical Engineering Reference Manual for the Electrical and Computer PE Exam—Sixth Edition," Professional Publications, Inc., ISBN: 1-888577-56-8, 2002, 21 pages (Part 5).
PPI Course Catalog, 2004, available at: https://web.archive.org/web/20040220012405/http://ppi2pass.com/catalog/servlet/MyPpi_fl_corner-catalog.pdf, 16 pages.
"Teaching an Electrical and Computer Engineering PE Exam Review Course," PPI, 2003, available at: https://web.archive.org/web/20031223100101/http://ppi2pass.com/catalog/servlet/MyPpi_pg_corner-teachee.html, 2 pages.
"Instructors Corner," PPI, 2003, available at: https://web.archive.org/web/20031219232547/http://ppi2pass.com/catalog/servlet/MyPpi_pg_corner-corner.html, 2 pages.
EE-Reference Online Index, 2004, available at: https://web.archive.org/web/20040731020344/http://ppi2pass.com/catalog/servlet/MyPpi_fl_indices-EERMindex.pdf, 41 pages.
EE-Reference Online Introduction, 2004, available at: https://web.archive.org/web/20041013101643/http://ppi2pass.com/catalog/servlet/MyPpi_fl_indices-EERMIntro.pdf, 12 pages.
"Electrical PE Exam Review Products," PPI Online Catalog, 2004, available at: https://web.archive.org/web/20040214233851/http://ppi2pass.com/catalog/servlet/MyPpi_ct_ELECTRICAL, 7 pages.
"The PPI Online Catalog," 2004, available at: https://web.archive.org/web/20040215142016/http://ppi2pass.com/catalog/servlet/MyPpi_ct_MAIN, 2 pages.
Homepage of Professional Publications, Inc., 2004, available at: https://web.archive.org/web/20040209054901/http:/ppi2pass.com/catalog/servlet/MyPpi, 1 page.
"What PPI Customers Say," 2003), available at: https://web.archive.org/web/20031226130924/http://ppi2pass.com/catalog/servlet/MyPpi_pg_comments-EEcomments.html, 2 pages.
"About PPI," 2003, available at: https://web.archive.org/web/20031219231426/http://ppi2pass.com:80/catalog/servlet/MyPpi_pg_aboutppi.html, 1 page.
Amazon.com listing of EE-Reference, 2007, available at: https://web.archive.org/web/20070103124447/https://www.amazon.com/Electrical-Engineering-Reference-Manual-Computer/dp/1888577568/, 7 pages.
Hampton, "Low-cost fracking offers boon to oil producers, headaches for suppliers," Reuters, Sep. 12, 2019, https://www.reuters.com/article/us-usa-oil-electric-fracturing-focus/low-cost-fracking-offers-boon-to-oil-producers-headaches-for-supplies, 11 page.
"All Electric Fracturing—Reducing Emissions and Cost," 2021, H013770, 6 pages.
Abbott et al., "Crippling the Innovation Economy: Regulatory Overreach at the Patent Office," Regulatory Transparency Project of the Federalist Society, Aug. 14, 2017, 35 pages.
"Hydraulic Fracturing Techbook," HARTENERGY, 2015, 9 pages.
"Petroleum Alumnus and Team Development Mobile Fracturing Unit that Alleviates Environmental Impact," LSU College of Engineering, 2021, 2 pages.
"Clean Fleet Reduces Emissions by 99% at Hydraulic Fracturing Sites," FluidPower Journal, 2019, 5 pages.
Deuster, "Game-changing hydraulic fracturing technology, reduces emissions by 99%," Intrado GlobeNewswire, Oct. 1, 2014, 4 pages.
"Halliburton Delivers Successful Grid-Powered Frac Operation", Halliburton News Release, Jan. 14, 2021, 4 pages.
Wang et al., "Development In The Limited—Entry Completion Fracturing Technique," SPE 17834, 1988, 13 pages.
Holden III et al., "Successful Stimulation of Fordoche Field With a Retarded HF Acid," Society of Petroleum Engineers of AIME, Aug. 1981, 6 pages.
Milligan, "Sour Gas Well Completion Practices in the Foothills," Society of Petroleum Engineers of AIME, Sep. 1982, 12 pages.
Beck et al., "Reservoir Evaluation Of Fractured Cretaceous Carbonates In South Texas," SPWLA Eighteenth Annual Logging Symposium, Jun. 5-8, 1977, 25 pages.
Webster, "Current Completion Practices in Tight Reservoirs," Society of Petroleum Engineers, SPE 6379, 1977, 8 pages.
Bielstein, "Wire-Line Methods and Equipment," Humble Oil and Refining Company, Apr. 2, 1967, 16 pages.
"Form-wound Squirrel-Cage Induction Motors—500 Horsepower and Larger," ANSI/API Standard, 541-2003, Fourth Edition, Jun. 2004, 88 pages.
Gardner Denver, "Well Servicing Pump, Model GD-2500Q, Quintuplex, Operating and Service Manual," 300FWF996 Revision C, Aug. 2005, 46 pages.
"Standard Specification for Steel Bars, Carbon and Alloy, Hot-Wrought, General Requirements for," ASTM Int;l, A 29/A29M—May 2005, 16 pages.
"Variable Speed Pumping: A Guide to Successful Applications," Elsevier 2004, ISBN 1-85617-449-2, 2004, 186 pages.
Bonnett et al., "Squirrel Cage Rotor Options for A.C. Induction Motors," IEEE, 2000, 14 pages.
Bonnett, "Root Cause Failure Analysis for AC Induction Motors in the Petroleum and Chemical Industry," IEEE, Paper No. PCIC-2010-43, 2010, 13 pages.
"Mark's Standard Handbook for Mechanical Engineers, 11th Edition," McGraw-Hill, ISBN 0-07-142867-4, 2006, 11 pages.

(56) References Cited

OTHER PUBLICATIONS

"Standard Handbook for Electrical Engineers," Thirteenth Edition, McGraw-Hill, ISBN 0-07-020984-7, 1993, 9 pages (Part 1).
"Standard Handbook for Electrical Engineers," Thirteenth Edition, McGraw-Hill, ISBN 0-07-020984-7, 1993, 7 pages (Part 2).
"Standard Handbook for Electrical Engineers," Thirteenth Edition, McGraw-Hill, ISBN 0-07-020984-7, 1993, 6 pages (Part 3).
"112 IEEE Standard Test Procedure for Polyphase Induction Motors and Generators," IEEE Power Engineering Society, IEEE Std 112, 2004, 42 pages (Part 1).
"112 IEEE Standard Test Procedure for Polyphase Induction Motors and Generators," IEEE Power Engineering Society, IEEE Std 112, 2004, 45 pages (Part 2).
Hodowanec et al., "Introduction to API Standard 541, 4th Edition—Form-Wound Squirrel Cage Induction Motors—Larger than 500 Horsepower," IEEE, Paper No. PCIC-2003-33, 2003, 9 pages.
Rahill et al., "Sorting Out the Overlap," IEEE Industry Applications Magazine, vol. 15, No. 1, Jan.-Feb. 2009, 12 pages.
"Manufacturers of Cushioned Clamping, Quick Coupling & Support Systems," ZSI Beta Clamps, ZSI, Inc., Apr. 29, 2015, 2 pages.
Meikrantz et al., "Advances in Liquid/Liquid Centrifuge Design Provide New Options for Petroleum Production," Society of Petroleum Engineers, SPE 56709, 1999, 4 pages.
"Process Burner" (https://www.cebasrt.com/productsloii-gaslprocess-bumer) 06 Sep. 6, 2018 (Sep. 6, 2018), entire document, especially para (Burners for refinery Heaters].
Notice of Allowance issued in corresponding U.S. Appl. No. 16/570,331, dated Jan. 9, 2020.
Notice of Allowance issued in corresponding U.S. Appl. No. 14/622,532, dated Mar. 27, 2017.
Non-Final Office Action issued in corresponding U.S. Appl. No. 15/356,436, dated Aug. 19, 2019.
Non-Final Office Action issued in corresponding U.S. Appl. No. 15/486,970, dated Jun. 22, 2017.
Non-Final Office Action issued in corresponding U.S. Appl. No. 15/487,656, dated Jun. 23, 2017.
Notice of Allowance issued in corresponding U.S. Appl. No. 15/217,040, dated Mar. 28, 2017.
Notice of Allowance issued in corresponding U.S. Appl. No. 15/635,028, dated Apr. 23, 2019.
International Search Report and Written Opinion issued in PCT Application No. PCT/US2018/063970, dated Mar. 5, 2019.
Non-Final Office Action issued in corresponding U.S. Appl. No. 15/487,694, dated Jun. 26, 2017.
Non-Final Office Action issued in corresponding U.S. Appl. No. 15/644,487, dated Jul. 25, 2018.
Non-Final Office Action issued in corresponding U.S. Appl. No. 15/644,487, dated Nov. 13, 2017.
Non-Final Office Action issued in corresponding U.S. Appl. No. 15/994,772, dated Sep. 3, 2019.
Non-Final Office Action issued in corresponding U.S. Appl. No. 16/152,695, dated Mar. 3, 2020.
Non-Final Office Action issued in corresponding U.S. Appl. No. 16/152,732, dated Oct. 2, 2019.
Non-Final Office Action issued in corresponding U.S. Appl. No. 16/160,708, dated Dec. 12, 2018.
UK Power Networks—Transformers to Supply Heat to Tate Modern—from Press Releases May 16, 2013.
Non-Final Office Action issued in corresponding U.S. Appl. No. 16/170,695, dated Feb. 12, 2019.
Non-Final Office Action issued in corresponding U.S. Appl. No. 16/170,695, dated Jun. 7, 2019.
Non-Final Office Action issued in corresponding U.S. Appl. No. 16/210,749, dated Feb. 25, 2019.
Non-Final Office Action issued in corresponding U.S. Appl. No. 16/268,030, dated Jun. 7, 2019.
Non-Final Office Action issued in corresponding U.S. Appl. No. 16/268,030, dated May 10, 2019.
Non-Final Office Action issued in corresponding U.S. Appl. No. 16/268,030, dated Sep. 11, 2019.
Non-Final Office Action issued in corresponding U.S. Appl. No. 16/385,070, dated Aug. 4, 2020.
Non-Final Office Action issued in corresponding U.S. Appl. No. 16/385,070, dated Oct. 11, 2019.
Non-Final Office Action issued in corresponding U.S. Appl. No. 16/404,283, dated Jul. 21, 2021.
Non-Final Office Action issued in corresponding U.S. Appl. No. 16/443,273, dated Sep. 20, 2019.
Non-Final Office Action issued in corresponding U.S. Appl. No. 16/564,186, dated Dec. 6, 2019.
Non-Final Office Action issued in corresponding U.S. Appl. No. 16/597,008, dated Dec. 23, 2019.
Final Office Action issued in corresponding U.S. Appl. No. 16/210,749, dated Jun. 11, 2019.
Final Office Action issued in corresponding U.S. Appl. No. 15/294,349, dated Jul. 6, 2017.
International Search Report and Written Opinion issued in PCT Application No. PCT/US2018/063977, dated Feb. 15, 2019.
Final Office Action issued in corresponding U.S. Appl. No. 15/145,491, dated Jan. 20, 2017.
Final Office Action issued in corresponding U.S. Appl. No. 14/622,532, dated Dec. 7, 2016.
Final Office Action issued in corresponding U.S. Appl. No. 14/622,532, dated Dec. 21, 2015.
International Search Report and Written Opinion issued in PCT Application No. PCT/US2020/000017, dated Jul. 22, 2020.
International Search Report and Written Opinion issued in PCT Application No. PCT/US2019/055325, dated Jan. 2, 2020.
International Search Report and Written Opinion issued in PCT Application No. PCT/US2019/055323, dated Feb. 11, 2020.
International Search Report and Written Opinion issued in PCT Application No. PCT/US2019/051018, dated Nov. 26, 2019.
Non-Final Office Action issued in corresponding U.S. Appl. No. 15/145,443, dated Feb. 7, 2017.
International Search Report and Written Opinion issued in PCT Application No. PCT/US2019/027584, dated Jul. 9, 2019.
International Search Report and Written Opinion issued in PCT Application No. PCT/US2019/016635, dated Apr. 10, 2019.
International Search Report and Written Opinion issued in PCT Application No. PCT/US2018/040683, dated Sep. 19, 2018.
International Search Report and Written Opinion issued in PCT Application No. PCT/US2018/054542, dated Jan. 2, 2019.
International Search Report and Written Opinion issued in PCT Application No. PCT/US2018/054548, dated Jan. 2, 2019.
International Search Report and Written Opinion issued in PCT Application No. PCT/US2018/055913, dated Dec. 31, 2018.
International Search Report and Written Opinion issued in PCT Application No. PCT/US2018/057539, dated Jan. 4. 2019.
Arvani et al., "Design and Development of an Engineering Drilling Simulator and Application for Offshore Drilling for MODUs and Deepwater Environments," Society of Petroleum Engineers, SPE-170301-MS, 2014, 17 pages.
Davis, "Natural Gas Finding Niche in E-Fracking, But Diesel Still Rules," Natural Gas Intelligence, NGI, 2019, 9 pages.
Mistry et al., "Induction Motor Vibrations in View of the API 541—4th edition," IEEE, Paper No. PCIC-, 2008, 10 pages.
Paschall et al., "Navigating the Test Requirements of API 541 4th Edition," IEEE, Paper No. PCIC—Nov. 2007, 2007, 12 pages.
"G7 Adjustable Speed Drive Operation Manual," Toshiba, Document No. 51546-009, Mar. 2005, 221 pages.
"Weir SPM: General Catalog," Weir SPM, 2009, 40 pages.
Krueger, "Advances in Well Completion and Stimulation During JPT's First Quarter Century," Journal of Petroleum Technology, Dec. 1973, pp. 16.
Lietard et al., "Hydraulic Fracturing of Horizontal Wells: An Update of Design and Execution Guidelines," Society of Petroleum Engineers, SPE 37122, 1996, 15 pages.
Waters et al., "Simultaneous Hydraulic Fracturing of Adjacent Horizontal Wells in the Woodford Shale," Society of Petroleum Engineers, SPE 119635, 2009, 22 pages.
Bahadori et al., "Dictionary of Oil, Gas, and Petrochemical Processing," CRC Press, ISBN: 978-1-4665-8825-7, 2014, 8 pages.

(56) References Cited

OTHER PUBLICATIONS

"A Dictionary for the Oil and Gas Company—Second Edition," The University of Texas at Austin—Petroleum Extension Service, ISBN: 978-0-88698-240-9, 2011, 7 pages.
"Lessons Learned from Natural Gas STAR Partners: Reduced Emissions Completions for Hydraulically Fractured Natural Gas Wells," U.S. Environmental Protection Agency, 2011, 12 pages.
Kidnay et al., "Fundamentals of Natural Gas Processing—Second Edition," CRS Press, ISBN: 978-1-4200-8519-8, 2011, 19 pages (Part 1).
Kidnay et al., "Fundamentals of Natural Gas Processing—Second Edition," CRS Press, ISBN: 978-1-4200-8519-8, 2011, 17 pages (Part 2).
Kidnay et al., "Fundamentals of Natural Gas Processing—Second Edition," CRS Press, ISBN: 978-1-4200-8519-8, 2011, 12 pages (Part 3).
Listing at Amazon.com for Kidnay et al., "Fundamentals of Natural Gas Processing—Second Edition," CRS Press, ISBN: 978-1-4200-8519-8, Jul. 7, 2013, 4 pages.
Listing at Amazon.com for Kidnay et al., "Fundamentals of Natural Gas Processing—Second Edition," CRS Press, ISBN: 978-1-4200-8519-8, Feb. 22, 2015, 4 pages.
"Green Completions," IPIECA, Jan. 20, 2015, 7 pages.
"Sand Trap FAQ," Mountain Equipment of New Mexico, Inc., Jan. 8, 2014, 2 pages.
"Test Separators FAQ," Mountain Equipment of New Mexico, Inc., Jan. 8, 2014, 2 pages.
"Emergency Power Systems for Critical Facilities: A Best Practices Approach to Improving Reliability," FEMA, FEMA P-1019. Sep. 2014, 170 pages.
Persily et al., "Indoor Environmental Issues in Disaster Resilience," NIST Technical Note 1882, Jul. 2015, 40 pages.
"Precision Heat and Control Systems for Onshore Drilling and Production," Chromalox Precision Heat and Control, 2011, 6 pages.
"ZEUS Electric Pumping Unit," Halliburton, printed 2021, 4 pages.
Nayyar, "Piping Handbook—Seventh Edition," Piping Handbook, 1999, 77 pages.
"Wire Rope Isolator Technologies," ITT Enidine, Inc., Mar. 29, 2014, Enidine, 78 pages.
Gardner Denver, Well Servicing Pump, Model GD-2500Q, GD-2500Q-HD, Quintuplex Pumps, Super GWS Fluid End (Uni-Flange) Parts List, 310FWF997 Revision A, Sep. 2011, 45 pages.
Wachel et al., "Analysis of Vibration and Failure Problems in Reciprocating Triplex Pumps for Oil Pipelines," The American Society of Mechanical Engineers, 1985, 8 pages.
"Flowline Products and Services—World Proven Chiksan and Weco Equipment," FMC Technologies, Mar. 28, 2015, 31 pages (Part 1).
"Flowline Products and Services—World Proven Chiksan and Weco Equipment," FMC Technologies, Mar. 28, 2015, 49 pages (Part 2).
"A complete line of swivel joints for drilling, production, and well servicing," Chiksan Original Swivel Joints, Nov. 1996, 16 pages.
"Worlds Best Swivel Joints," FlowValve, Jan. 17, 2015, available at https://web.archive.org/web/20150117041757/http://www.flowvalve.com/swivels, 10 pages.
"Victaulic Couplings—Vibration Attenuation Characteristics," Victaulic Company, Oct. 2014, 5 pages.
Hudson et al., "Modeling Victaulic Couplings in Piping Stress Analysis Programs," Victaulic Company, WP-18 6685 Rev. B, Mar. 19, 2013, 19 pages.
"AGS Flexible Coupling Style W77," Victaulic, Apr. 23, 2015, available at: https://web.archive.org/web/20150423052817/http://www.victaulic.com/en/products-services/products/style-w77-ags-flexible-coupling/, 1 page.
"Advanced Groove System (AGS) Large Diameter Solutions." Victaulic, Apr. 19, 2015, available at: https://web.archive.org/web/20150419063052/http:/www.victaulic.com/en/businesses-solutions/solutions/advanced-groove-system/, 2 pages.
"Accommodating Seismic Movement," Victaulic, Apr. 12, 2015, available at https://web.archive.org/web/20150412042941/http:/www.victaulic.com/en/businesses-solutions/solutions/accommodating-seismic-movement/, 2 pages.
Saville, "The Victaulic Pipe Joint," Journal (American Water Works Association), Nov. 1922, vol. 9, No. 6, 8 pages.
Balaji et al., "Wire rope isolators for vibration isolation of equipment and structures," IP Conference Series: Materials Science and Engineering, 2015, 12 pages.
"FlowGuard Products," CoorsTek, Sep. 15, 2014 available at: https://web.archive.org/web/20140915230538/http://coorstek.com/resource-library/library/8510-1747-FlowGuard-Pulsation-Dampers.pdf, 8 pages.
"FlowGuard Pulsation Dampeners," CoorsTek, Feb. 23, 2015, available at: https://web.archive.org/web/20150223101630/http://www.coorstek.com/markets/energy_equipment/oil-gas/flowguard.php, 2 pages.
Morton, "Unlocking the Earth: A Short History of Hydraulic Fracturing," GEO ExPro, vol. 10, No. 6, Dec. 2013, 5 pages.
"Welcome to STAUFF," STAUFF, Aug. 5, 2013, 1 page.
"STAUFF Clamps," STAUFF, Aug. 7, 2013, 3 pages.
"STAUFF Clamps, Heavy Series (DIN 3015-2)," STAUFF, Aug. 30, 2013, 1 page.
"Heavy Series (DIN 3015-2)", STAUFF, Product Literature, Nov. 3, 2013, 1 page.
"Heavy Series DIN 3015, Part 2," STAUFF, Nov. 5, 2013, 24 pages.
Harris et al., "Harris' Shock and Vibration Handbook—Fifth Edition," McGraw-Hill Handbooks, 2002 [excerpted], 22 pages.
"Mark's Standard Handbook for Mechanical Engineers, 11th Edition," McGraw-Hill, ISBN 0-07-142867-4, 2007 [excerpted], 1 page.
Mallik et al., "On the Modelling of Non-Linear Elastomeric Vibration Isolators," Journal of Sound and Vibration, 1999, 219(2), 15 pages.
Malcius, "Mathematical model evaluation and parameter identification of pipe holder element," Journal of Vibroengineering, Jun. 2013, vol. 15, Issue 2, ISSN 1392-8716, 9 pages.
Wachel et al., "Piping Vibration Analysis," Engineering Dynamics, Incorporated, Proceedings of the Nineteenth Turbomachinery Symposium, 1990, 16 pages.
Albone, "Mobile Compressor Stations for Natural Gas Transmission Service," ASME 67-GT-33, Turbo Expo, Power for Land, Sea and Air, vol. 79887, p. 1-10, 1967.
Canadian Office Action issued in Canadian Application No. 2,928,707, dated Sep. 8, 2020.
Canadian Office Action issued in Canadian Application No. 2,944,980, dated Aug. 31, 2020.
Canadian Office Action issued in Canadian Application No. 2,982,974, dated Sep. 22, 2020.
Final Office Action issued in corresponding U.S. Appl. No. 15/356,436, dated Mar. 31, 2020.
Final Office Action issued in corresponding U.S. Appl. No. 16/404,283, dated Jan. 11, 2021.
Final Office Action issued in corresponding U.S. Appl. No. 16/597,014, dated Feb. 4, 2021.
Goodwin, "High-voltage auxiliary switchgear for power stations," Power Engineering Journal, 1989, 10 pg. (Year 1989).
"Heat Exchanger" (https://en.wikipedia.org/w/index.php?title=Heat_exchanger&oldid=89300146) Dec. 18, 2019, Apr. 2019 (Apr. 18, 2019), entire document, especially para (0001].
International Search Report and Written Opinion issued in PCT Application No. PCT/US2020/023809, dated Jun. 2, 2020.
International Search Report and Written Opinion issued in PCT Application No. PCT/US2020/023821, dated Aug. 28, 2020.
International Search Report and Written Opinion issued in PCT Application No. PCT/US2020/036932, dated Sep. 3, 2020.
International Search Report and Written Opinion issued in PCT Application No. PCT/US2020/053980, dated Dec. 14, 2020.
International Search Report and Written Opinion issued in PCT Application No. PCT/US2020/058899, dated Feb. 3, 2021.
International Search Report and Written Opinion issued in PCT Application No. PCT/US2020/058906, dated Feb. 2, 2021.

(56) References Cited

OTHER PUBLICATIONS

International Search Report and Written Opinion issued in PCT Application No. PCT/US2020/059834, dated Feb. 4, 2021.
International Search Report and Written Opinion issued in PCT Application No. PCT/US2020/066543, dated May 11, 2021.
International Search Report and Written Opinion issued in PCT Application No. PCT/US2020/067146, dated Mar. 29, 2021.
International Search Report and Written Opinion issued in PCT Application No. PCT/US2020/067523, dated Mar. 22, 2021.
International Search Report and Written Opinion issued in PCT Application No. PCT/US2020/067526, dated May 6, 2021.
International Search Report and Written Opinion issued in PCT Application No. PCT/US2020/067528, dated Mar. 19, 2021.
International Search Report and Written Opinion issued in PCT Application No. PCT/US2020/067608, dated Mar. 30, 2021.
Karin, "Duel Fuel Diesel Engines," (2015). Taylor & Francis, pp. 62-63, retrieved from https://app.knovel.com/hotlink/oc/id:kpDFDE0001/dual-fuel-diesel-engines/duel-duel-diesel-engines (Year 2015).
Morris et al., U.S. Appl. No. 62/526,869; Hydration-Blender Transport and Electric Power Distribution for Fracturing Operation; Jun. 28, 2018; USPTO; see entire document.
Non-Final Office Action issued in corresponding U.S. Appl. No. 14/881,525, dated Jul. 21, 2021.
Non-Final Office Action issued in corresponding U.S. Appl. No. 14/622,532, dated Aug. 5, 2015.
Non-Final Office Action issued in corresponding U.S. Appl. No. 15/145,443, dated May 8, 2020.
Non-Final Office Action issued in corresponding U.S. Appl. No. 15/356,436, dated Oct. 26, 2020.
Non-Final Office Action issued in corresponding U.S. Appl. No. 16/167,083, dated Aug. 31, 2020.
Non-Final Office Action issued in corresponding U.S. Appl. No. 16/356,263, dated Sep. 2, 2020.
Non-Final Office Action issued in corresponding U.S. Appl. No. 16/377,861, dated Jun. 22, 2020.
Non-Final Office Action issued in corresponding U.S. Appl. No. 16/404,283, dated Jun. 29, 2020.
Non-Final Office Action issued in corresponding U.S. Appl. No. 16/443,273, dated Oct. 5, 2020.
Non-Final Office Action issued in corresponding U.S. Appl. No. 16/458,696, dated May 22, 2020.
Non-Final Office Action issued in corresponding U.S. Appl. No. 16/522,043, dated Jan. 4, 2021.
Non-Final Office Action issued in corresponding U.S. Appl. No. 16/564,185, dated Jan. 29, 2021.
Non-Final Office Action issued in corresponding U.S. Appl. No. 16/728,359, dated Jun. 29, 2020.
Non-Final Office Action issued in corresponding U.S. Appl. No. 16/871,928, dated Aug. 25, 2021.
Non-Final Office Action issued in corresponding U.S. Appl. No. 16/943,727, dated Aug. 3, 2021.
Non-Final Office Action issued in corresponding U.S. Appl. No. 16/943,727, dated Sep. 29, 2020.
Notice of Allowance issued in corresponding U.S. Appl. No. 15/829,419, dated Jul. 26, 2021.
Canadian Office Action issued in Canadian Application No. 2,928,711, dated Apr. 18, 2018.
"Water and Glycol Heating Systems" (https://www.heat-inc.com/wg-series-water-glycol-systems/) Jun. 18, 2018 (Jun. 18, 2018), entire document, especlally WG Series Water Glycol Systems.
Woodbury et al., "Electric Design Considerations for Drilling Rigs," IEEE Transactions on Industry Applications, vol. 1A-12, No. 4, Jul./Aug. 1976, pp. 421-431.
Canadian Office Action issued in Canadian Application No. 2,833,711, dated Mar. 2, 2018.
Canadian Office Action issued in Canadian Application No. 2,833,711, dated May 30, 2019.
Canadian Office Action issued in Canadian Application No. 2,886,697, dated Jun. 22, 2018.
Canadian Office Action issued in Canadian Application No. 2,933,444, dated Aug. 18, 2020.
Canadian Office Action issued in Canadian Application No. 2,936,997, dated Jan. 30, 2019.
Non-Final Office Action issued in corresponding U.S. Appl. No. 15/294,349, dated Mar. 14, 2017.
International Search Report and Written Opinion issued in PCT Application No. PCT/US2020/023912, dated Jun. 23, 2020.
Non-Final Office Action issued in corresponding U.S. Appl. No. 14/622,532, dated May 17, 2016.
Non-Final Office Action issued in corresponding U.S. Appl. No. 14/881,535, dated May 20, 2020.
Non-Final Office Action issued in corresponding U.S. Appl. No. 14/881,535, dated Oct. 6, 2017.
Non-Final Office Action issued in corresponding U.S. Appl. No. 14/884,363, dated Sep. 5, 2017.
Non-Final Office Action issued in corresponding U.S. Appl. No. 15/145,414, dated Nov. 29, 2017.
Non-Final Office Action issued in corresponding U.S. Appl. No. 15/145,491, dated May 15, 2017.
Non-Final Office Action issued in corresponding U.S. Appl. No. 15/145,491, dated Sep. 12, 2016.
Non-Final Office Action issued in corresponding U.S. Appl. No. 15/183,387, dated Apr. 2, 2018.
Canadian Office Action issued in Canadian Application No. 2,964,597, dated Jun. 20, 2019.
Non-Final Office Action issued in corresponding U.S. Appl. No. 15/217,040, dated Nov. 29, 2016.
Non-Final Office Action issued in corresponding U.S. Appl. No. 15/217,081, dated Oct. 4, 2018.
Non-Final Office Action issued in corresponding U.S. Appl. No. 15/235,716, dated May 29, 2018.
Non-Final Office Action issued in corresponding U.S. Appl. No. 15/235,788, dated Dec. 14, 2016.
Non-Final Office Action issued in corresponding U.S. Appl. No. 15/291,842, dated Jan. 6, 2017.
Non-Final Office Action issued in corresponding U.S. Appl. No. 15/293,681, dated Feb. 16, 2017.
Non-Final Office Action issued in corresponding U.S. Appl. No. 15/294,349, dated Apr. 10, 2018.
Canadian Office Action issued in Canadian Application No. 2,936,997, dated Oct. 1, 2019.
Canadian Office Action issued in Canadian Application No. 2,943,275, dated Mar. 1, 2019.
Canadian Office Action issued in Canadian Application No. 2,944,968, dated Aug. 17, 2020.
Canadian Office Action issued in Canadian Application No. 2,945,281, dated Sep. 28, 2018.
Kroposki et al., "Making Microgrids Work," 6 IEEE Power and Energy Mag. 40, 41, 2008.
Ton et al., "The U.S. Department of Energy's Microgrid Initiative," 25 The Electricity J. 84, 2012, pp. 84-94.
Non-Final Office Action issued in U.S. Appl. No. 16/871,328 mailed Dec. 9, 2021.
Non-Final Office Action issued in U.S. Appl. No. 16/943,935 mailed Oct. 21, 2021.
Non-Final Office Action issued in U.S. Appl. No. 16/564,186, mailed Oct. 15, 2021.
Final Office Action issued in U.S. Appl. No. 16/356,263 mailed Oct. 7, 2021.
Non-Final Office Action issued in U.S. Appl. No. 17/060,647 mailed Sep. 20, 2021.
Non-Final Office Action issued in U.S. Appl. No. 16/901,774 mailed Sep. 14, 2021.
Canadian Office Action issued in Canadian Application No. 3,094,768 mailed Oct. 28, 2021.
Steven C. Carlson, Weaponizing IPRs, Landslide, Sep. 22, 2019, 10 pages.
Testimony of Judge Paul R. Michel (Ret.) United States Court of Appeals for the Federal Circuit Before the Subcommittee on Intellectual Property, U.S. Senate Committee on the Judiciary, Jun. 4, 2019, 8 pages.

(56) References Cited

OTHER PUBLICATIONS

The American Heritage Dictionary of the English Language, Fifth Edition, Fiftieth Anniversary, p. 911, 4 pages.
*Transcend Shipping Systems LLC* v *Mediterranean Shipping Company S.A.*, Case No. 6:21-cv-00040, Document 27, Order of Dismissal with Prejudice, Dec. 7, 2021, 1 page.
Transcend Shipping Systems, LLC and Hapag-Lloyd AG and Hapag-Lloyd (America) LLC, CMA CGM (America) LLC and CMA CGM S.A., Mediterranean Shipping Company S.A., Case Nos. 6:20-cv-1195-ADA, 6:21-cv-0018-ADA, and 6:21-cv-0040-ADA, Document 19, Proposed Amended Scheduling Order, Aug. 13, 2021, 6 pages.
U.S. Department of Labor—Occupational Safety and Health Administration, Hazard Alert—Worker Exposure to Silica during Hydraulic Fracturing, 2012, 7 pages.
U.S. Department of Labor—Occupational Safety and Health Administration, https://web.archive.org/web/20150406152927/https://www.osha.gov/, 4 pages.
U.S. Department of Labor—Occupational Safety and Health Administration, Hydraulic Fracturing and Flowback Hazards Other than Respirable Silica, 27 pages.
U.S. Department of Labor—Occupational Safety and Health Administration, OSHA and NIOSH issued hazard alert on ensuring workers in hydraulic fracturing operations have appropriate protections from silica exposure, Jun. 21, 2012, 4 pages.
U.S. Well Services Investor and Analyst Update: Second Quarter 2021 in Review, 201, 7 pages.
*U.S. Well Services, Inc. and U.S. Well Services, LLC* v *Halliburton Company and Cimarex Energy Co.*, Case 6:21-cv-00367-ADA, Document 56, Defendants' Opening Claim Construction Brief, Oct. 27, 2021, 46 pages.
*U.S. Well Services, Inc. and U.S. Well Services, LLC* v *Halliburton Company and Cimarex Energy Co.*, Case 6:21-cv-00367-ADA, Document 63, Defendants' Claim Construction Brief in Reply to U.S. Well Services, LLC's Responsive Brief, Dec. 2, 2021, 30 pages.
*U.S. Well Services, Inc. and U.S. Well Services, LLC* v *Halliburton Company and Cimarex Energy Co.*, Case No. 6:21-cv-00367-ADA, Document 1-8, Exhibit H, Halliburton - All Electric Fracturing Reducing Emissions and Cost, Apr. 15, 2021, 6 pages.
*U.S. Well Services, Inc. and U.S. Well Services, LLC* v *Halliburton Company and Cimarex Energy Co.*, Case No. 6:21-cv-00367-ADA, Document 51, Agreed Scheduling Order, Sep. 16, 2021, 5 pages.
*U.S. Well Services, Inc. and U.S. Well Services, LLC* v *Halliburton Company and Cimarex Energy Co.*, Case No. 6:21-cv-00367-ADA, Plaintiff U.S. Well Services, LLC's Disclosure of Extrinsic Evidence, Oct. 19, 2021, 10 pages.
*U.S. Well Services, Inc. and U.S. Well Services, LLC* v *Halliburton Company and Cimarex Energy Co.*, Case No. 6:21-cv-00367-ADA, Plaintiff's Disclosure of Asserted Claims and Preliminary Infringement Contentions, Jul. 12, 2021, 9 pages.
U.S. Well Services, Inc. files suit against Halliburton Company and Cimarex Energy Co. for patent infringement, Apr. 15, 2021, PR Newswire, https://www.prnewswire.com/news-releases/US-well-services-inc-files-suit-against-halliburton-company-and-cimarex-energy-co-for-patent-infringement-301270118.html, 2 pages.
*U.S. Well Services, Inc.* v *Halliburton Company*, Case No. 6:21-cv-00367-ADA, Civil Docket, accessed Dec. 17, 2021, 14 pages.
*U.S. Well Services, Inc.* v. *Halliburton Company*, Civil Docket for Case # 6:21-cv-00367-ADA, https://ecf.txwd.uscourts.gov/cgi-bin/DktRpt.pl?190912742001885-L_1_0-1, Accessed Nov. 29, 2021, 13 pages.
*U.S. Well Services, Inc., and U.S. Well Services, LLC* v *Halliburton Company, Cimarex Energy Co.*, Halliburton Energy Services, Inc., and Halliburton US Technologies, Inc., Case No. WA:21-CV-00367-ADA, Document 61, Order Setting Markman Hearing, Dec. 8, 2021, 1 page.
*U.S. Well Services, Inc., and U.S. Well Services, LLC* v *Halliburton Company, Cimarex Energy Co., Halliburton Energy Services, Inc., and Halliburton US Technologies, Inc.*, Case No. WA:21-CV-00367-ADA, Document 61, Order Setting Markman Hearing, Nov. 29, 2021, 1 page.
*U.S. Well Services, LLC* v *Tops Well Services, LLC and Honghua America, LLC*, Case No. 3:19-cv-00237, Document 1, Plaintiff's Original Complaint, 63 pages.
*U.S. Well Services, LLC* v *Tops Well Services, LLC and Honghua America, LLC*, Case No. 3:19-cv-00237, Document 72, Plaintiff's Opening Claim Construction Brief, Apr. 24, 2020, 37 pages.
*U.S. Well Services, LLC* v *Tops Well Services, LLC and Honghua America, LLC*, Case No. 3:19-cv-00237, Document 90, Plaintiff's Opposition to Defendants' Motion for Summary Judgment of Invalidity under 35 USC 112, 30 pages.
*U.S. Well Services, LLC* v *Tops Well Services, LLC*, Case No. 3:19-cv-237, Document 135, Order, Sep. 22, 2021, 2 pages.
"Kerr Pumps & FlowVale Awards for Excellence in Well Completion, Northeast 2017—Awarded to: U.S. Well Services," https://www.oilandgasawards.com/winner/northeast-2017-kerr-pumps-flowvale-awards .., accessed Oct. 5, 2021, 4 page.
"New Technology Development Award—General/Products, Northeast 2015—Awarded to: U.S. Well Services, LLC," https://www.oilandgasawards.com/winner/northeast-2015-new-technology-development-award-generalproducts/#, accessed Aug. 23, 2021, 4 pages.
"Screenshot of USWS Clean Fleet System Video," 1 pages.
"Services—U.S. Well Services," http://uswellservices.com/services/, accessed Nov. 13, 2021, 10 pages.
"U.S. Well Services Issues $125.5 Million Convertible Senior Secured PIK Notes, Executes License Agreement with ProFrac Manufacturing, LLC and Finalizes Amendment to Senior Secured Term Loan," Jun. 28, 2021, https://finance.yahoo.com/news/u-well-services-issues-125-203000637.html?guccounter-1, 6 pages.
"VZ Environmental Award of Excellence in Environmental Stewardship, Rocky Mountain 2016—Awarded to: U.S. Well Services, LLC," Oil & Gas Awards, 2016, https://www.oilandgasawards.com/winner/rocky-mountain-2016-vz-environmental-award-for-excellence-in-environmental-stewardship, accessed Aug. 23, 2021, 4 pages.
49 C.F.R. Part 393 (Oct. 1, 2006), 36 pages.
A. B. Lobo Ribeiro et al., "Multipoint Fiber-Optic Hot-Spot Sensing Network Integrated Into High Power Transformer for Continuous Monitoring," IEEE Sensors Journal, Jul. 2008, vol. 8, No. 7, pp. 1264-1267.
A. T. Dufresne, "How reliable are trial dates relied on by the PTAB in the Fintiv analysis?" Perkins Coie, 2021, 3 pages.
Affidavit of Duncan Hall, Internet Archives on Jun. 7, 2021, https://web.archive.org/web/20120917102614/http://www.quincieoilfield.com/pdf/3.0%20Gardner%20Denver/2500/GD2500Q%200p%20&%20Service%20Manual.pdf, 46 pages.
America Invents Act, H.R. Rep. No. 112-98, Jun. 1, 2011, 165 pages.
Approved American National Standard, ANSI/NEMA MG Jan. 2011, American National Standard Motors and Generators, Dec. 9, 2021, 636 pages.
Assignment record of U.S. Pat. No. 9,366,114, accessed Aug. 19, 2021, 2 pages.
Bernard D. Goldstein, The Role of Toxicological Science in Meeting the Challenges and Opportunites of Hydraulic Fracturing, 2014, Toxicological Sciences, vol. 139, No. 2, pp. 271-283.
Centers for Disease Control and Prevention, NIOSH Numbered Publications, https://web.archive.org/web/20120721180008/http://www.cdc.org/niosh/pubs/all_date_desc_nopubnumbers.html, 20212, 57 pages.
Dani Kass, "Fintiv Fails: PTAB Uses 'Remarkably Inaccurate' Trial Dates," Nov. 2, 2021, Law 360, 1 page.
Declaration of Dr. L. Brun Hilbert, Jr., P.E., IPR2021-01538, U.S. Appl. No. 10/408,031, filed Sep. 22, 2021, 99 pages.
Declaration of Dr. L. Brun Hilbert, P.E., IPR2021-01037 and IPR2021-01038, U.S. Pat. No. 9,745,840 and U.S. Appl. No. 10/408,030, filed Jun. 21, 2021, 124 pages.
Declaration of Dr. Mark Ehsani, IPR2021-01035, U.S. Pat. No. 9,970,278, Jun. 18, 2021, 188 pages.
Declaration of Dr. Mark Ehsani, IPR2021-01066, U.S. Pat. No. 10,020,711, filed Jul. 2, 2021, 213 pages.

(56) References Cited

OTHER PUBLICATIONS

Declaration of Dr. Robert Durham, IPR2021-01065, U.S. Pat. No. 9,840,901, Jun. 18, 2021, 138 pages.
Declaration of Duncan Hall, Internet Archive, Oct. 26, 2021, https://web.archive.org/web/20140531134153/http://www.amazon/com/Star-Tech-NETRS2321E-RS-232-Serial-Ethernet/dp/B000YBONOS, 43 pages.
Declaration of Duncan Hall, Jul. 23, 2021, https://web.archive.org/web/20031219231426/http://ppi2pass.com:80/catalog/servlet/MyPpi_pg_aboutppi.html, 12 pages.
Declaration of Joel N. Broussard, Case Nos. IPR2021-01032 & IPR2021-01033, U.S. Pat. No. 9,410,410 and U.S. Pat. No. 8,789,601, Oct. 13, 2021, 9 pages.
Declaration of Joel N. Broussard, IPR2021-01034, IPR2021-01035, IPR2021-01036, and IPR2021-01037, U.S. Appl. No. 10/337,308 and U.S. Pat. No. 9,970,278 and U.S. Pat. No. 9,611,728 and U.S. Pat. No. 9,745,840, Oct. 20, 2021, 11 pages.
Declaration of Joel N. Broussard, IPR2021-01038, U.S. Appl. No. 10/408,030, filed Oct. 20, 2021, 11 pages.
Declaration of Joel N. Broussard, IPR2021-01065, U.S. Pat. No. 9,840,901, Oct. 20, 2021, 11 pages.
Declaration of Nathaniel E. Frank-White, Internet Archive, Feb. 17, 2022, http://web.archive.org/web/20140329090440/http://www.enidline.com/pdffiles/WR_Catalog_2012.pdf, 82 pages.
Declaration of Robert Durham, IPR2021-01315, U.S. Pat. No. 9,893,500, Aug. 12, 2021, 209 pages.
Declaration of Robert Durham, IPR2021-01316, U.S. Pat. No. 10,280,724, filed Aug. 13, 2021, 75 pages.
Declaration of Robert Durham, IPR2022-00074, U.S. Pat. No. 10,254,732, filed Nov. 8, 2021, 177 pages.
Declaration of Robert Schaaf, Case Nos. IPR2021-01032 and IPR2021-01033, U.S. Pat. No. 9,410,410 and U.S. Pat. No. 8,789,601, Oct. 12, 2021, 45 pages.
Declaration of Robert Schaaf, IPR2021-01034, U.S. Pat. No. 10,337,308, filed Oct. 20, 2021, 47 pages.
Declaration of Robert Schaaf, IPR2021-01035, U.S. Pat. No. 9,970,278, Oct. 20, 2021, 51 pages.
Declaration of Robert Schaaf, IPR2021-01037, U.S. Pat. No. 9,745,840, Oct. 20, 2021, 52 pages.
Declaration of Robert Schaaf, IPR2021-01038, U.S. Pat. No. 10,408,030, filed Nov. 10, 2021, 40 pages.
Declaration of Robert Schaaf, IPR2021-01065, U.S. Pat. No. 9,840,901, Nov. 10, 2021, 33 pages.
Declaration of Robert Schaaf, IPR2021-01066, U.S. Pat. No. 10,020,711, filed Nov. 17, 2021, 43 pages.
Declaration of Robert Schaaf, IPR2021-01238, U.S. Pat. No. 10,526,882, filed Nov. 17, 2021, 38 pages.
Declaration of Robert Schaaf, IPR2021-01315, U.S. Pat. No. 9,893,500, Nov. 19, 2021, 39 pages.
Declaration of Robert Schaaf, IPR2021-01316, U.S. Pat. No. 10,280,724, filed Nov. 19, 2021, 33 pages.
Declaration of Robert Schaaf, IPR2021-01538, U.S. Pat. No. 10,408,031, filed Dec. 28, 2021, 40 pages.
Declaration of Robert Schaaf, IPR2021-01539, U.S. Pat. No. 10,648,311, filed Jan. 25, 2022, 37 pages.
Declaration of Robert Schaaf, IPR2022-00074, U.S. Pat. No. 10,254,732, filed Feb. 17, 2022, 36 pages.
Declaration of Sylvia D. Hall-Ellis, IPR2022-00610, U.S. Pat. No. 10,934,824, filed Feb. 28, 2022, 98 pages.
Declaration of Sylvia D. Hall-Ellis, Ph.D., Case Nos. IPR2021-01032, IPR2021-01033, and IPR-2021-01034, U.S. Pat. No. 9,410,410 and U.S. Pat. No. 8,789,601 and U.S. Appl. No. 10/337,308, filed Jun. 18, 2021, 173 pages.
Declaration of Dr. Robert Durham, Case Nos. IPR2021-01033, IPR2021-01032 and IPR2021-01034, U.S. Pat. No. 8,789,601 and U.S. Pat. No. 9,410,410 and U.S. Appl. No. 10/337,308, filed Jun. 18, 2021, 179 pages.
Department of Transportation, Federal Motor Carrier Safety Administration, 49 CFR Parts 390, 392 and 393—Parts and Accessories Necessary for Safe Operation; General Amendments; Final Rule, Federal Register, Aug. 15, 2005, vol. 70, No. 156, 49 pages.
Email from Michael See on Jun. 10, 2021 regarding API-541 Fourth Edition: Public Availability, 2 pages.
Excerpt of File Wrapper of U.S. Pat. No. 10,119,381, 24 pages, Oehring et al., Nov. 2018.
U.S. Pat. No. 10,934,824, 24 pages, Oehring et al., Mar. 2021.
U.S. Pat. U.S. Appl. No. 62/180,289, 32 pages.
U.S. Appl. No. 62/204,331, 22 pages.
U.S. Appl. No. 62/242,566, 34 pages.
U.S. Appl. No. 62/323,168, 41 pages.
U.S. Appl. No. 62/323,303, 62 pages.
U.S. Pat. No. 10,020,711, 250 pages, Oehring et al., Jul. 2018.
U.S. Pat. No. 10,254,732. 552 pages, Oehring et al., Apr. 2019.
U.S. Pat. No. 10,280,724, 668 pages, Hinderliter, May 2019.
U.S. Pat. No. 10,337,308, 861 pages, Broussard et al., Jul. 2019.
U.S. Pat. No. 10,408,030, 401 pages, Oehring et al., Sep. 2019.
File Wrapper of U.S. Pat. No. 10,408,031, 734 pages, Oehring et al., Sep. 2019.
File Wrapper of U.S. Pat. No. 10,526,882, 845 pages, Oehring et al., Jan. 2020.
File Wrapper of U.S. Pat. No. 8,789,601, 159 pages, Broussard et al., Jul. 2014.
File Wrapper of U.S. Pat. No. 9,410,410, 263 pages, Broussard et al., Jun. 2016.
File Wrapper of U.S. Pat. No. 9,410,410, Excerpt—Response to Non-Final Office Action filed Feb. 3, 2016, 57 pages.
File Wrapper of U.S. Pat. No. 9,745,840, 215 pages, Oehring et al., Aug. 2017.
File Wrapper of U.S. Pat. No. 9,840,901, 216 pages, Oehring et al., Dec. 2017.
File Wrapper of U.S. Pat. No. 9,893,500, 291, pages, Oehring et al., Feb. 2018.
File Wrapper of U.S. Pat. No. 9,970,278, 310 pages, Broussard et al., May 2018.
Final Office Action issued in corresponding U.S. Appl. No. 15/145,491 dated Sep. 6, 2017.
Final Office Action mailed Jan. 21, 2021 in U.S. Appl. No. 16/458,696.
Gardner Denver, 3" 1502 Male Hammer Union Discharge Flange, 2005, 13 pages.
Hart Energy, Hydraulic Fracturing Techbook, 2015, 99 pages.
Henry Chajet, "OSHA Issues Alert on Non-Silica Fracking Hazards," Jan. 30, 2015, National Law Review Newsroom, 2 pages.
International Search Report and Written Opinion mailed Sep. 11, 2019 in related PCT Application No. PCT/US19/37493.
Jim Harris, "U.S. Well Services LLC—Energy and Mining Magazine", Energy & Mining International, Oct. 12, 2021, https://www.emi-magazine.com/sections/profiles/1221-us-well-services-llc, 3 pages.
John A. Camera, PE, Electrical Engineering Reference Manual for the Electrical and Computer PE Exam, Sixth Edition, 2002, 102 pages.
John Daniel, "8.30 DEP Industry Observations: New Flac Fleet; New Fleet Designs Forthcoming," Daniel Energy Partners, Aug. 30, 2020, 13 pages.
Katsuhiko Ogata, Modern Control Engineering: Third Edition, 1997, 2 pages.
*Kirsch Research and Development, LLC v Tarco Specialty Products, Inc.* Case No. 6:20-cv-00318-ADA, Document 62, Memorandum Opinion and Order Granting Defendant's Opposed Motion to Stay Pending Inter Partes Review of the '482 Patent [ECF No. 57], Oct. 4, 2021, 6 pages.
*LedComm LLC v Signify North America Corporation*, Case No. 6:20-cv-01056-ADA, Civil Docket, accessed Dec. 8, 2021, 11 pages.
*Ledcomm LLC v Signifty North America Corp.*, Signify Holding B.V., and Signify N.V., Case No. 6:20-cv-01056-ADA, Document 24, Scheduling Order, Aug. 13, 2021, 4 pages.
Liz Hampton, "U.S. Well Services files e-frac patent lawsuit against Halliburton, Cimarex Energy," Reuters, Apr. 15, 2021, https://Www.reuters.com/business/energy/US-well-services-files-e-frac-patent-lawsuit-against-halliburton-cimarex-energy, 10 pages.
Maxwell James Clerk 1868, On Governors, Proc. R. Soc. Lond., pp. 16270-283.

(56) References Cited

OTHER PUBLICATIONS

Mike Soraghan, OSHA issues hazard alert for fracking and drilling, E&E, Dec. 10, 2014, 1 page.

Non-Final Office Action issued Mar. 6, 2019 in related U.S. Appl. No. 15/183,387.

Occupational Safety and Health Administration—Home, United States Department of Labor, https://web.archive.org/web/20120722160756/http://www.osha.gov/, accessed Jun. 13, 2021, 2 pages.

OSHA Publications, U.S. Department of Labor—Occupational Safety and Health Administration, https://web.archive.org/web/20150406054914/https://www.osha.gov/pls/publications/publication.AthruZ?pType=Industry, Jun. 13, 2021, 3 pages.

Portfolio Media Inc., A Shift to Sand: Spotlight on Silica Use in Fracking, Law360, https://www.law360.com/articles/366057/print?section=energy, accessed Jun. 10, 2021, 5 pages.

Professional Publications, Inc., Books for the FE, PE, FIs and PLS Exams, Spring 2004, http://www.ppi2pass.com/corner/catalog.pdf, 16 pages.

Professional Publications, Inc., Electrical Engineering Reference Manual, 12 pages.

Project Registration, Moxastore, http://www.moxastore.com, Feb. 15, 2015, 2 pages.

Public Catalog of the U.S. Copyright Office for search result: electrical engineering reference manual, https://cocatalog.oc.gov/cgi-bin/Pwebrecon.cgi?v1=6&ti=1, 6&Search_Arg=electrical engineering reference manual&Search_Code=TALL&CNT=25&PI . . . , accessed Jul. 21, 2021, 2 pages.

Publications, U.S. Department of Labor—Occupational Safety and Health Administration, https://web.archive.org/web/20150626140537/https://www.osha.gov/pls/publications/publication.html, 47 pages.

Random House Webster's Unabridged Dictionary, Second Edition, 2001, p. 990, 4 pages.

Ryan Davis, "Albright Says He'll Very Rarely Put Cases on Hold For PTAB," Law 360, https://www.law360.com/articles/1381597/print?section=ip, 2 pages.

Society of Automotive Engineers, Sae J1292: Automobile, Truck, Truck-Tractor, Trailer, and Motor Coach Wiring, 49 CFR 393.28, Oct. 1981, 6 pages.

Standing Order Governing Proceedings—Patent Cases, in the United States District Court for the Western District of Texas, Waco Division, filed Nov. 17, 2021, 11 pages.

\* cited by examiner

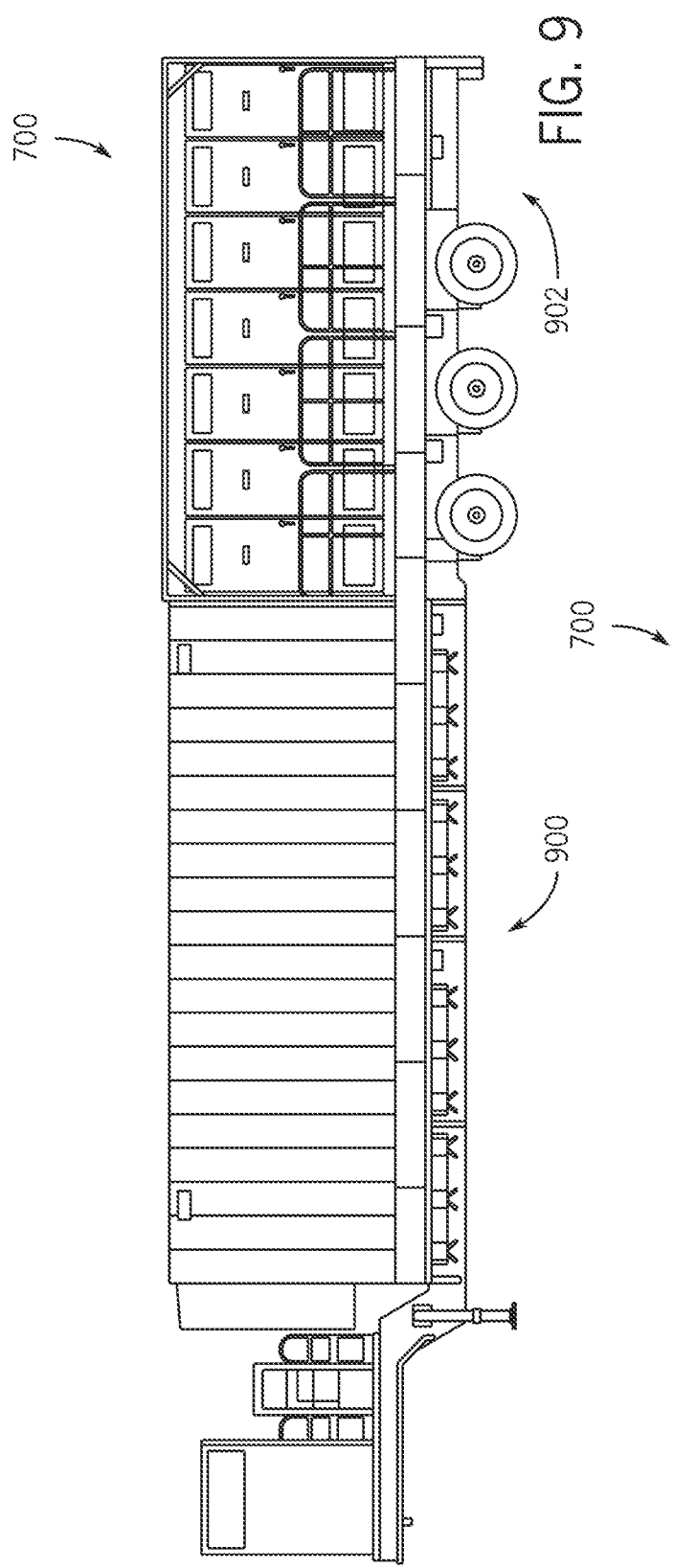
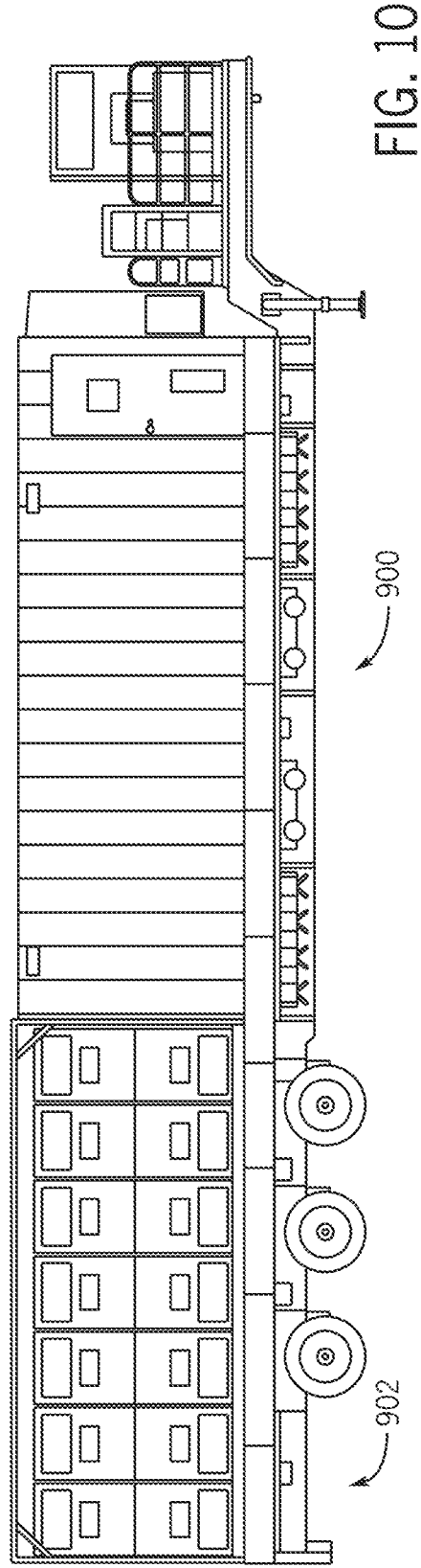

OVERSIZED SWITCHGEAR TRAILER FOR ELECTRIC HYDRAULIC FRACTURING

CROSS-REFERENCE TO RELATED APPLICATIONS

This application is a continuation of U.S. patent application Ser. No. 16/824,432 filed Mar. 19, 2020 titled "OVERSIZED SWITCHGEAR TRAILER FOR ELECTRIC HYDRAULIC FRACTURING," now U.S. Pat. No. 11,578,577 issued Feb. 14, 2023, which claims priority to and the benefit of U.S. Provisional patent application Ser. No. 62/821,138 filed Mar. 20, 2019 titled "OVERSIZED SWITCHGEAR TRAILER FOR ELECTRIC HYDRAULIC FRACTURING," the full disclosures of which are hereby incorporated herein by reference in their entirety for all intents and purposes.

BACKGROUND

1. Technical Field

This disclosure relates generally to hydraulic fracturing and more particularly to systems and methods for switchgear and power distribution systems.

2. Background

Hydraulic fracturing operations may be performed at remote locations, and as a result, trailers and other equipment are utilized to transport equipment between well sites. However, certain regulations may restrict loads along roadways, which may drive one or more design considerations for equipment utilized at well sites. These smaller, compact trailers may lead to comprises to design that would otherwise not be desirable.

SUMMARY

The present disclosure is directed to configurations for trailers utilized in hydraulic fracturing operations.

In an embodiment, a hydraulic fracturing system for fracturing a subterranean formation includes a primary switchgear, arranged on a support structure, the primary switchgear electrically coupled to a power source to receive power from the power source. The system also includes a secondary switchgear, arranged on the support structure, the secondary switchgear positioned separately from the primary switchgear and within an enclosure, the secondary switchgear receiving an electrical input from the primary switchgear and including an plurality of feed connections for supplying electrical power to a plurality of fracturing equipment. The system further includes support equipment, arranged on the support structure, the support equipment providing one or more services to at least the secondary switchgear.

In an embodiment an electrical distribution system for providing electrical to hydraulic fracturing equipment includes a primary bus, arranged on a support structure, electrically coupled to at least one generator providing electrical power to a breaker coupled to the primary bus and also arranged on the support structure. The system also includes a secondary bus, arranged on the support structure, electrically coupled to the primary bus via at least one cable, the secondary bus being positioned within an enclosure and including a plurality of feed connections for supplying electrical power to at least one piece of fracturing equipment.

In an embodiment, a hydraulic fracturing system for fracturing a subterranean formation includes at least one generator and at least one switchgear system receiving electrical power from the generator, the switchgear system including a primary bus and a secondary bus both arranged on a first support structure. The system also includes an electric powered pump, arranged on a second support structure, the electric powered pump coupled to a well associated with the subterranean formation and powered by at least one electric motor, the electric powered pump configured to pump fluid into a wellbore associated with the well at a high pressure so that the fluid passes from the wellbore into the subterranean formation and fractures the subterranean formation.

In an embodiment, multiple components of a switchgear system are incorporated into a single trailer, which may be an oversized trailer, to simplify operations at the well site. In various embodiments, incorporation of components onto a single trailer may eliminate certain components, such as cables, which may also reduce costs.

Embodiments of the present disclosure may facilitate advantageous configurations for trailers utilized at a well site that my reduce redundancy, eliminate wiring at the well site, and incorporate remote evaluation and monitoring capabilities.

Embodiments may provide for elimination or reduction of several redundant switchgear breakers. Current configurations having multiple independent switchgear trailers may include separate, independent incoming and outgoing breakers, which may be used to comply with various professional codes. For example, if the switchgear trailers are divided up into a Common Bus Switchgear trailer and two or more Distribution Switchgear trailers, then each one needs incoming and outgoing breakers. Embodiments of the present disclosure may consolidate these components onto a single trailer unit, and as a result, only a single set of incoming and outgoing breakers are used for the entire system.

Embodiments may provide for elimination or reduction of interconnecting cables. In various embodiments, cables between the individual switchgear trailers will no longer be needed or a number used may be reduced. Due to the possible amperage between switchgear trailers, these cables are normally very large and heavy, which requires extra man power for rig up and rig down. They are also expensive and require additional insulation resistance tests before each energization. Elimination or reduced may reduce costs and complexity at the well site.

Embodiments may provide for remote 86 lockout relay controls incorporated into the system. The 86 lockout relays, which are tripped in the event of an electrical fault, can be reset externally using embodiments of the present disclosure. This prevents technicians from either: 1) interrupting operations by de-energizing the entire switchgear trailer so they can safely enter the switchgear house to reset the breaker, or 2) using arc flash suits, which can be difficult to put on in an oilfield environment and can possibly fail in the event of an are flash.

Embodiments may provide for remote breaker open and close systems to be incorporated into the system. The same benefits will apply as to the 86 lockout relay controls described above.

Embodiments may provide for remote ground check monitoring incorporated into the system. As a result, technicians are provided the ability to ensure cable integrity as well as positive cable coupling on any input or output without entering the switchgear enclosure, which is undesirable if any piece of equipment is energized.

Embodiments may provide for remote human machine interfaces (HMI) to be incorporated into the system. An HMI or GUI can be used to allow technicians to interface with the breakers and relays without being in the breaker enclosure. Control software instead of mechanical switches will allow access to more information and control options in a much smaller package which can be a minimum of one screen.

Embodiments may provide for remote monitoring incorporated into the system. Ethernet (or serial) support may enable an onsite data van for frac operations to monitor and control individual breaker settings and statuses. This information may be streamed to the data van in real (or near-real) time to enable an operator to react to readings. Furthermore, in various embodiments, alarms and automated progressing, among other features, may be utilized in order to react to certain data readings.

Embodiments may provide for remote data collection incorporated into the system. When data is sent to the data van, via Ethernet (or serial), it may also be collected and transmitted to a cloud based storage system for historical analysis as well as troubleshooting support. In various embodiments, the storage may also be local. For example, data may be streamed in real (or near-real) time to the cloud system, where it may be accessible via a remote client device. The data may be raw data or processed data, which may be processed using one or more computer systems associated with a distributed computing environment. Moreover, as will be appreciated, the data may be encrypted or otherwise access-restricted.

Embodiments may provide for remote laptop USB ports. In various embodiments, this may be an external port so technicians may download and observe detailed information as well as upload and download breaker settings without entering the energized switchgear housing. For example, the ports may be arranged external of an enclosure to enable technicians to gain data access from a remote location and/or from outside of the enclosure Embodiments may provide for external beaker indicator lights. Lights will give technicians and other onsite personnel a quick way to verifying breaker status such as Open/Closed/Tripped. The lights may be LED lights that are color coded and/or may involve individual lights associated with each status.

Embodiments may provide for shore power/battery power. The batteries may provide power for lights and/or initial breaker closing before a small onboard transformer can draw power to operate breakers and other ancillary functions. Often times, in cold weather or during startup with equipment difficulties, it is possible to deplete the batteries. A shore power connection provides an option for technicians to quickly and easily recharge the batteries from a small generator or light plant.

Embodiments may provide for battery heaters. This is to increase the operational longevity of the batteries as well as increase amp-hours in colder weather.

Adequate HVAC may be incorporated into the system. Heating and cooling keeps condensation out of sensitive electronics as well keeps them from overheating. Switchgear trailers of the present embodiments may be designed to maintain room temperature internally while operating is ambient temperatures of −25° C. to 55° C.

In various embodiments, the system may include at least 24 outgoing breakers. However, it should be appreciated that more outgoing breakers may be incorporated. As a result, power may be provided to 22 frac pumps and 2 blenders simultaneously.

In various embodiments, the system may include at least 2 incoming breakers. However, it should be appreciated that more incoming breakers may be incorporated. In various operations, power may be distributed from 2 larger block turbine generators (e.g., 30 MW and above) or up to 4 small block turbine generators (e.g., 10 MW and below). The incoming breakers for the new equipment may be positioned to accept power from large or small block turbine generators. Software settings can be changed to accommodate for either sized generator. Older generations of switchgear trailers could only accept power from 4 small turbine generators while certain designs can accept power from up to 3 large or small turbine generators, with the most common set up being one large turbine generator and one small turbine generator load sharing through a 3000A common bus on the switchgear trailer.

Embodiments may provide for a compact switchgear. The feeder breakers (or outgoing) may be reduced to a 1200A bus. This allows the components to be much more compact. A single compact breaker can fit within a 15"×36" or 26"×45" section instead of the larger 3'×8' profile of the incoming breakers.

Embodiments may provide for 3000A or 2000A bus bar sections. This configuration provides for load sharing multiple turbine generators on a common bus.

Embodiments may provide for 3000A, 2000A, or 1200A bus bar sections. Such a configuration may enable power distributions to multiple individual power loads such as frac pumps, blenders, hydration units, sand equipment, water pumps, chemical mixers, data vans, etc.

Embodiments may provide for bus connectors (BCs). The use of incoming and outgoing breakers with a common bus for load sharing may be utilized in systems of the present disclosure. As a result, an economical platform which can fit enough capability onto a single trailer is provided. In various embodiments, using bus connectors between different bus segments that have no (or limited) external cable connections, enables safe distribution of power from high amperage bus sections to lower amperage rated bus sections. Bus connectors can be in the form of fuses, switches, fused switches, or breakers. Fuses and switches are generally more compact and cheaper than breakers. Switches also allow the advantage of providing technicians with a visible disconnect between bus work which is important during maintenance or troubleshooting tasks. However, switches may not be remotely controllable.

Embodiments may provide for a separate bus work. That is, differently rated bus bar sections can be used together on the same switchgear trailer. Accordingly, a 3000A or 2000A common bus for load sharing between multiple generators for the incoming breakers as well as lower rated 2000A or 1200A bus bar sections for smaller more compact switchgear breakers for the outgoing power distribution is provided.

Embodiments may provide for fused switches. In various embodiments, using fused switches for protection in between differently rated sections of bus bars is a cheaper and more compact alternative to using full sized breakers and relays.

Embodiments may provide for a divided current bus bar. As will be described below, a lower amperage rated bus bar would effectively load share more than its rated amperage. This would work by having the incoming power physically entering the bus work in the middle with the feeder breakers (power load) being distributed to either end of the bus work where either side could only draw half of the possible power load. This would cause a current divider, where the maximum amperage drawn by either side of the main breakers would be under the limits of the bus work. This reduces costs by for example, being able to use a 2000A bus bar instead of a larger and costlier 3000A bus bar.

Embodiments may provide for multiphase receptacles. If the power requirement is below a threshold, for example approximately 10 MW, then cables and receptacles can be used that are in a three phase conductor configuration with an embedded ground and ground check conductor all within a single cable jacket and receptacle housing. This reduces the amount of physical connections that are required as well as increasing safety and reducing EMF. Sometimes several cables are used in parallel to transmit large amounts of power while keeping the cables to a manageable size.

Embodiments may provide for single phase receptacles. To transmit power from larger generators, a single phase cable scheme if often used. This method can use multiple single conductor cables per phase and an independent ground conductor. Ruggedized single conductor quick disconnecting receptacles are used to preserve stress cones which are often fragile and can fail if they are damaged or dirty. An alternative method is to use standard NEMA 2 hole lugs with indoor or outdoor stress cones to lug the cables directly to the busbars. However, such a configuration may include tradeoffs, such as shorter service life.

The mobile switchgear units of the present disclosure can be trailerized, skid mounted, or mounted on a bodyload truck.

Embodiments may provide for arc flash rating. Individual switchgear breakers can be rated as explosion proof, which means that arc flash suits are not required by personnel inside any enclosure as long as the breaker cabinets are closed. Moreover, the breakers may be unrated which means that personnel cannot safely enter the switchgear enclosures without an arc flash suit. Non-explosion rated gear is usually physically more compact. With non-explosion proof gear, features such as remote open/close, remote 86 lockout reset, and remote instrumentation may provide safe and seamless operations.

Embodiments may provide for generators. In embodiments, switchgear systems described herein can accept power from many types of power sources such as turbine generators, reciprocating generators, battery banks, utility power grids, etc.

Embodiments may provide for instrumentation that may be incorporated into the system, such as potential transformers (PTs) and current transformers (CTs) to monitor voltage and amperage levels on all breakers, buses, cables, fuses, and switches.

BRIEF DESCRIPTION OF DRAWINGS

Some of the features and benefits of the present disclosure having been stated, others will become apparent as the description proceeds when taken in conjunction with the accompanying drawings, in which:

FIGS. 7-13 provide perspective, side, and top plan views of embodiments of the oversized switchgear trailer, in accordance with embodiments of the present disclosure;

Figure 1:
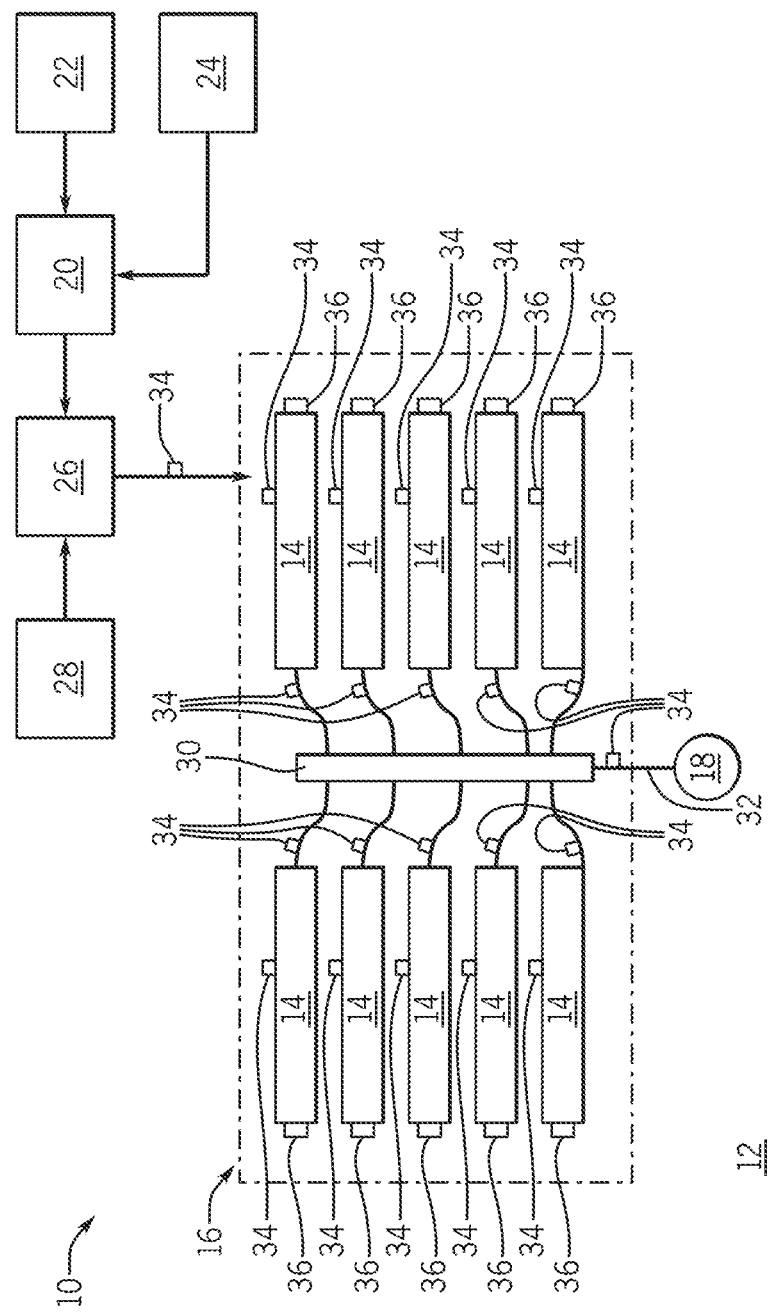
FIG. 1 is a schematic plan view of an embodiment of a fracturing operation, in accordance with embodiments of the present disclosure.

While the disclosure will be described in connection with the preferred embodiments, it will be understood that it is not intended to limit the disclosure to that embodiment. On the contrary, it is intended to cover all alternatives, modifications, and equivalents, as may be included within the spirit and scope of the disclosure as defined by the appended claims.

DETAILED DESCRIPTION

The method and system of the present disclosure will now be described more fully hereinafter with reference to the accompanying drawings in which embodiments are shown. The method and system of the present disclosure may be in many different forms and should not be construed as limited to the illustrated embodiments set forth herein; rather, these embodiments are provided so that this disclosure will be thorough and complete, and will fully convey its scope to those skilled in the art. Like numbers refer to like elements throughout. In an embodiment, usage of the term "about" includes +/−5% of the cited magnitude. In an embodiment, usage of the term "substantially" includes +/−5% of the cited magnitude.

It is to be further understood that the scope of the present disclosure is not limited to the exact details of construction, operation, exact materials, or embodiments shown and described, as modifications and equivalents will be apparent to one skilled in the art. In the drawings and specification, there have been disclosed illustrative embodiments and, although specific terms are employed, they are used in a generic and descriptive sense only and not for the purpose of limitation.

When introducing elements of various embodiments of the present disclosure, the articles "a", "an", "the", and "said" are intended to mean that there are one or more of the elements. The terms "comprising", "including", and "having" are intended to be inclusive and mean that there may be additional elements other than the listed elements. Any examples of operating parameters and/or environmental conditions are not exclusive of other parameters/conditions of the disclosed embodiments. Additionally, it should be understood that references to "one embodiment", "an embodiment", "certain embodiments", or "other embodiments" of the present disclosure are not intended to be interpreted as excluding the existence of additional embodiments that also incorporate the recited features. Furthermore, reference to terms such as "above", "below", "upper", "lower", "side", "front", "back", or other terms regarding orientation or direction are made with reference to the illustrated embodiments and are not intended to be limiting or exclude other orientations or directions. Additionally, recitations of steps of a method should be understood as being capable of being performed in any order unless specifically stated otherwise. Furthermore, the steps may be performed in series or in parallel unless specifically stated otherwise.

FIG. 1 is a plan schematic view of an embodiment of a hydraulic fracturing system 10 positioned at a well site 12. In the illustrated embodiment, pumps 14 (which may be arranged on one or more trailers, skids, or the like), making up a pumping system 16, are used to pressurize a slurry solution for injection into a wellhead 18. An optional hydration unit 20 receives fluid from a fluid source 22 via a line, such as a tubular, and also receives additives from an additive source 24. In an embodiment, the fluid is water and the additives are mixed together and transferred to a blender unit 26 where proppant from a proppant source 28 may be added to form the slurry solution (e.g., fracturing slurry) which is transferred to the pumping system 16. The pumps 14 may receive the slurry solution at a first pressure (e.g., 80 psi to 160 psi) and boost the pressure to around 15,000 psi for injection into the wellhead 18. In certain embodiments, the pumps 14 are powered by electric motors.

After being discharged from the pump system 16, a distribution system 30, such as a manifold, receives the slurry solution for injection into the wellhead 18. The distribution system 30 consolidates the slurry solution from each of the pumps 14 and includes discharge piping 32 coupled to the wellhead 18. In this manner, pressurized solution for hydraulic fracturing may be injected into the wellhead 18.

In the illustrated embodiment, one or more sensors 34, 36 are arranged throughout the hydraulic fracturing system 10 to measure various properties related to fluid flow, vibration, and the like.

It should be appreciated that while various embodiments of the present disclosure may describe electric motors powering the pumps 14, in embodiments, electrical generation can be supplied by various different options, as well as hybrid options. Hybrid options may include two or more of the following electric generation options: Gas turbine generators with fuel supplied by field gas, CNG, and/or LNG, diesel turbine generators, diesel engine generators, natural gas engine generators, batteries, electrical grids, and the like. Moreover, these electric sources may include a single source type unit or multiple units. For example, there may be one gas turbine generator, two gas turbines generators, two gas turbine generators coupled with one diesel engine generator, and various other configurations.

In various embodiments, equipment at the well site may utilize 3 phase, 60 Hz, 690V electrical power. However, it should be appreciated that in other embodiments different power specifications may be utilized, such as 4160V or at different frequencies, such as 50 Hz. Accordingly, discussions herein with a particular type of power specification should not be interpreted as limited only the particularly discussed specification unless otherwise explicitly stated. Furthermore, systems described herein are designed for use in outdoor, oilfield conditions with fluctuations in temperature and weather, such as intense sunlight, wind, rain, snow, dust, and the like. In embodiments, the components are designed in accordance with various industry standards, such as NEMA, ANSI, and NFPA.

Current switchgear trailer designs have focused on traditional breakers and standard DOT size limits for trailers. In order to fit the appropriate switchgear required to safely power and operate an electric hydraulic fracturing fleet, two to three full size switchgear trailers have been required. On well sites requiring a common bus to combine the power of multiple generators, a minimum of three switchgear trailers has been used. On well sites were a split bus is allowed, where not all generators can load share, a minimum of two switchgear trailers will be required. These historical requirements are also for fracturing fleets that will be used for single well operations on shallow shale formations that use a relatively lower Hydraulic Horsepower (HHP). Many modern fleets that perform zipper frac operations (simultaneous operations on two or more wells) on deep wells (higher well pressure) will require more HHP and therefore more frac pumps and the required switchgear to accommodate.

Figure 2:
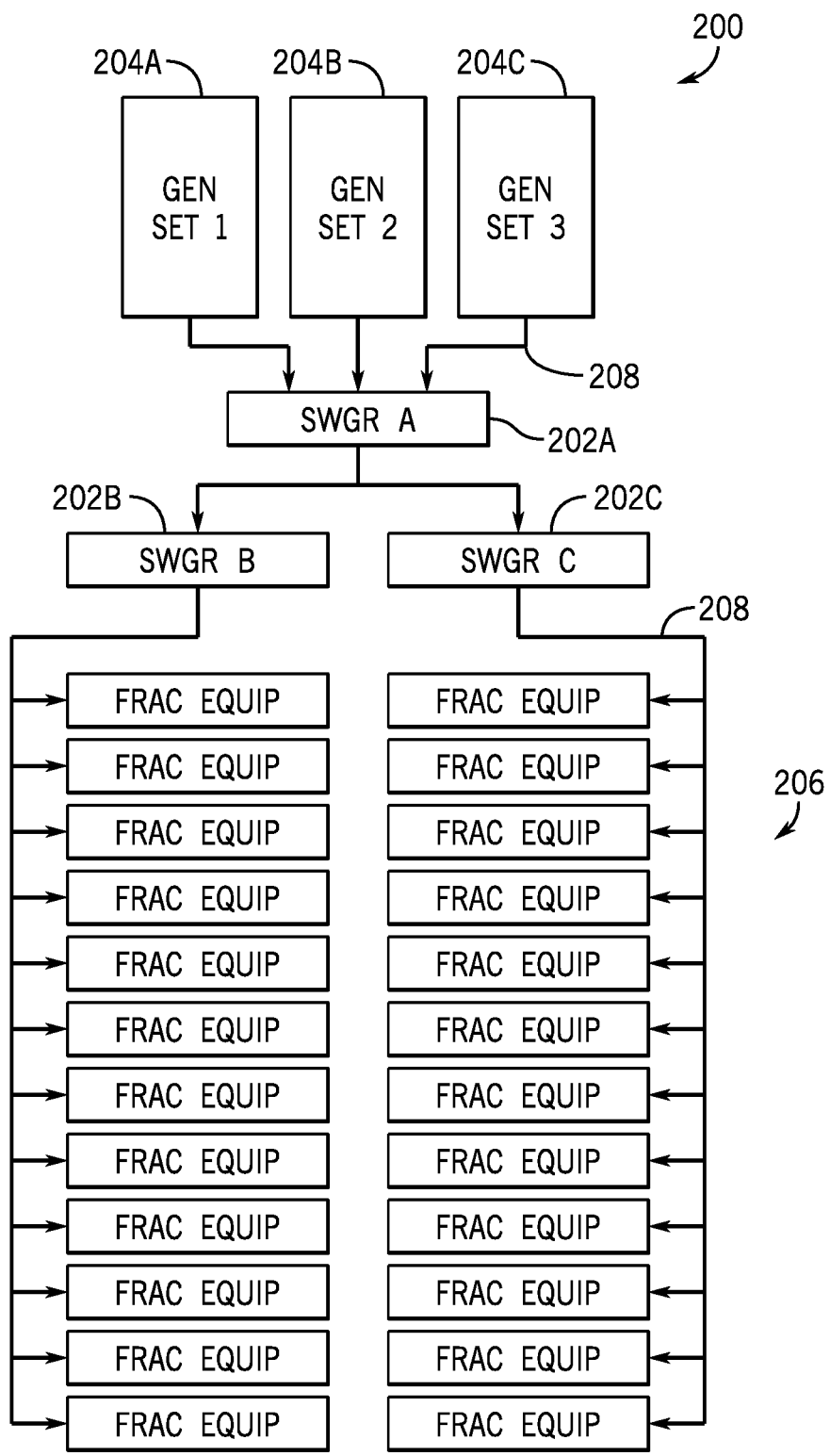
FIG. 2 is a schematic diagram of an embodiment of a well site layout using multiple switchgear trailers, in accordance with embodiments of the present disclosure.

FIG. 2 is a schematic diagram of an embodiment of a well site layout 200 using multiple switchgear trailers 202A, 202B, 202C (SWGR A, SWGR B, SWGR C). The layout 200 further includes generators 204A, 204B, 204C and fracturing equipment 206, which may include pumps, blenders, hydration units, etc. The three shown generators 204A-204C are load sharing through switchgear 202A ("SWGR A"), whereas switchgears 202B, 202C ("SWGR B" and "SWGR C") are designed using smaller feeder breakers (outgoing) for powering multiple pieces of equipment. Power cables 208 are illustrated as lines that include arrows, but it should be appreciated that a single black line with an arrow can be multiple parallel power cables, especially in the case of the interconnecting cables between SWGR A and SWGR B/C.

Frac equipment 206 can be frac pumps, blenders, hydration units, transformers, power distribution gear, variable frequency drives (VFDs), soft starters, motor control centers, water pumps, wireline equipment, cranes, datavans, support trailers, chemical trailers, fluid processing trailers, lighting equipment, wellsite instrumentation, gas processing equipment, safety equipment, utility lines, etc. Accordingly, while embodiments of the present disclosure may mention particular systems, such as pumps, it should not be interpreted as limiting coupling to various other equipment utilized at fracturing sites A current drawback with existing systems arises from the interconnection requirements between the switchgear trailers. Each individual switchgear trailer has both incoming and outgoing breakers to protect itself and the interconnecting power cables. This increases costs and also makes connection requirements more complicated, as described above. Previous switchgear trailer designs have focused on DOT trailer size limits and compactness to allow for multiple trailers to fit onto a well site. The limiting dimensions have been 8.5 ft wide, 53 ft long, and 13.5 ft high. Due to the size of large aero-derivative turbine engines, which are often packaged on custom oversized trailers for mobilization, the concept of allowing oversized trailers for other equipment is now feasible. Using larger switchgear trailers with consolidated distribution switchgear has many advantages. As long as the oversized switchgear trailer is no larger than the turbine trailer, the mobility of the hydraulic fracturing fleet as a whole will not be impacted. Embodiments of the present disclosure may take advantage of the relaxed size restrictions to provide an improved, oversized switchgear trailer.

Figure 3:
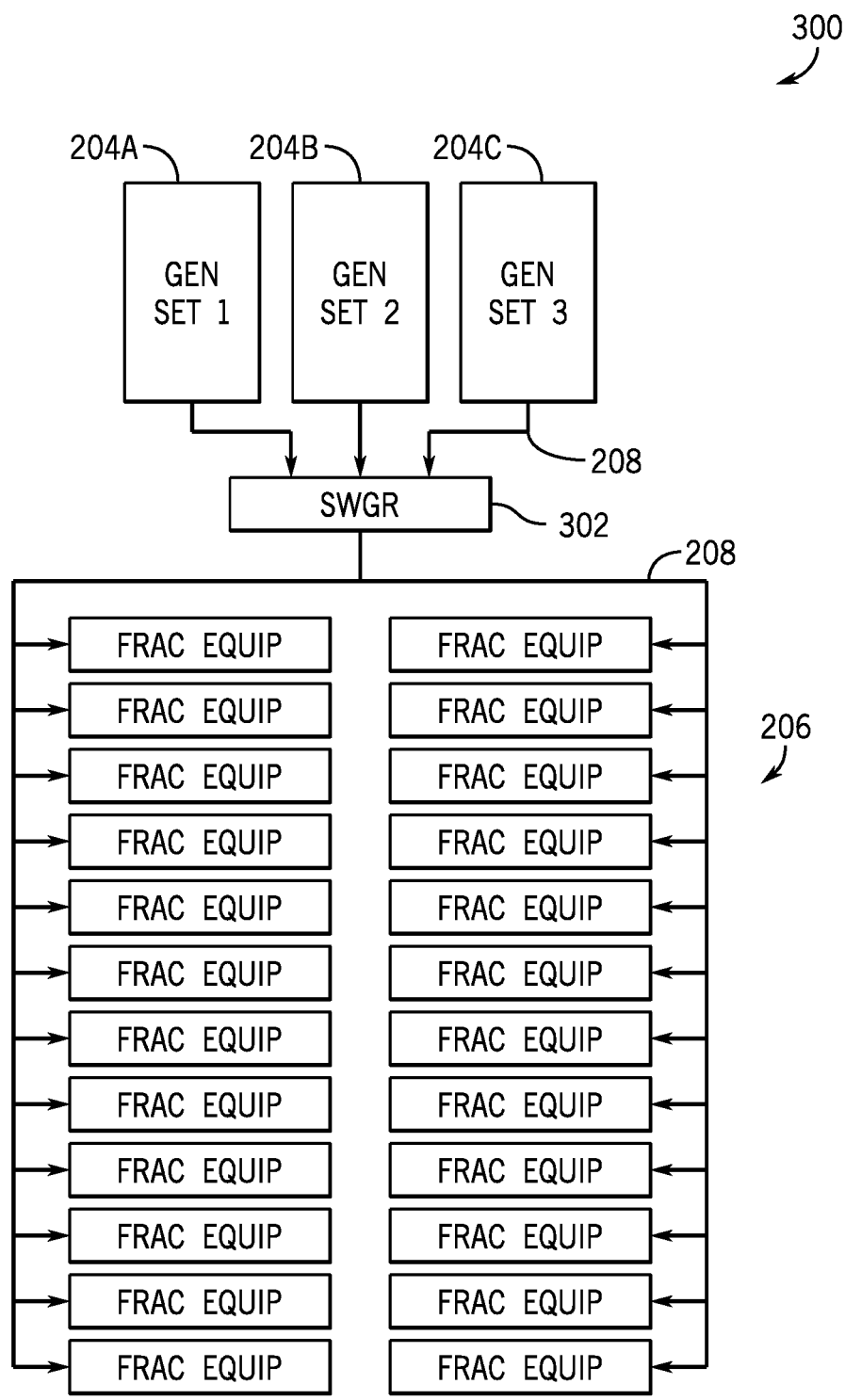
FIG. 3 is a schematic diagram of an embodiment of a wellsite including a consolidated switchgear trailer, in accordance with embodiments of the present disclosure.

FIG. 3 is a schematic diagram of an embodiment of a wellsite layout 300 including a consolidated switchgear trailer (SWGR) 302. As described above, the consolidated switchgear trailer may be capable of loading sharing and power distribution, while remaining mobile, as described above. Accordingly, various advantages can be realized. By way of example only, the SWGR 302 reduces or eliminates a number of interconnecting cables 208. For example, when compared to FIG. 2, it is evident that FIG. 3 has eliminated several sections of cable, for example, the cables connecting the switchgear trailer 202A to the switchgear trailers 202B, 202C.

As a result, there is less employee risk, as interconnecting cables weigh over 11 lbs/ft and can be in 50 ft, 100 ft, 150 ft, 200 ft, and 400 ft increments and are usually carried and connected by hand. Furthermore, elimination provides a capital cost reduction of up to $150,000 per fleet for the elimination of the power cables and connectors. Furthermore, up to $2 MM capital cost reduction in the net cost of 3 trailers vs. a single oversize trailer and the elimination of redundant switchgear breakers and relays. Additional benefits include shorter rig up/rig down time as total cables on the fleet can be reduced by 22-36 percent, depending on the wellsite layout. Also, less insulation resistance testing due to there being fewer multiconductor cables. This process is used during each rig up to ensure the integrity of the power cable insulation. This process can take two technicians up to 15 minutes per cable.

Furthermore, no spare inventory for the cable receptacles and jumpers internal to the switchgear would be utilized in systems of the present disclosure. Due to the load sharing capability, the interconnecting switchgear cables are usually a larger conductor than the cables that supply the frac equipment or generators. The elimination of this size of cables allows spare inventory to be also be eliminated. Additionally, fewer cables to transport and take up drop deck space. These cables can require their own drop deck trailer and tractor to transport between well sites. Moreover, reduced repair and maintenance costs associated with the cables. Cables that span between equipment often experience extreme wear and tear during the rig up and rig down process as well as corrosion when they are disconnected for mobilization. Additionally, there is a lower risk of cable failure due to there being fewer cables.

Embodiments also provide advantages with respect to utilizing the single trailer configuration illustrated for the SWGR 302. For example, a single oversized trailer, when compared to three standard trailers, uses 2 fewer tractors, 2 fewer drivers, less DOT trailer maintenance, lower total insurance costs, and space saved on pad due to fewer trailers as well as the elimination of the clearance requirement between switchgear trailers to allow for external cable connections.

Additional advantages include fewer trailers to spot on pad. Placing the equipment within inches of other trailers in specific spots can often be a time consuming process. This is also where equipment is the most likely to be damaged due to hitting other parked equipment at low speeds. Moreover, better cable management is provided because there are fewer trailers to interconnect and fewer cables.

Simplified breaker management is also provided using embodiments of the present disclosure. To energize a frac pump with multiple switchgear trailers, the process is often as follows: Close incoming breaker for SWGR A (202A)->Close Outgoing breaker to SWGR B (202B)->Close incoming breaker for SWGR B (202B)->Close outgoing breaker to frac pump. However, with a single consolidated switchgear trailer, the process is simplified as: Close incoming breaker for SWGR (302)>Close outgoing breaker to frac pump. If a bus connector is used, the process may be: Close incoming breaker for SWGR (302)>Close bus connector>Close outgoing breaker to frac pump. In most situations the bus connector will always (or mostly likely) remained closed and will not need to be operated every time. Additional advantages also include fewer potential arc flash areas due to there being fewer total switchgear breakers, less total HVAC maintenance due to there being fewer HVAC units, and earth grounding for a single trailer, which means fewer ground rods, less ground cable, and reduced rig up time.

Figure 4:
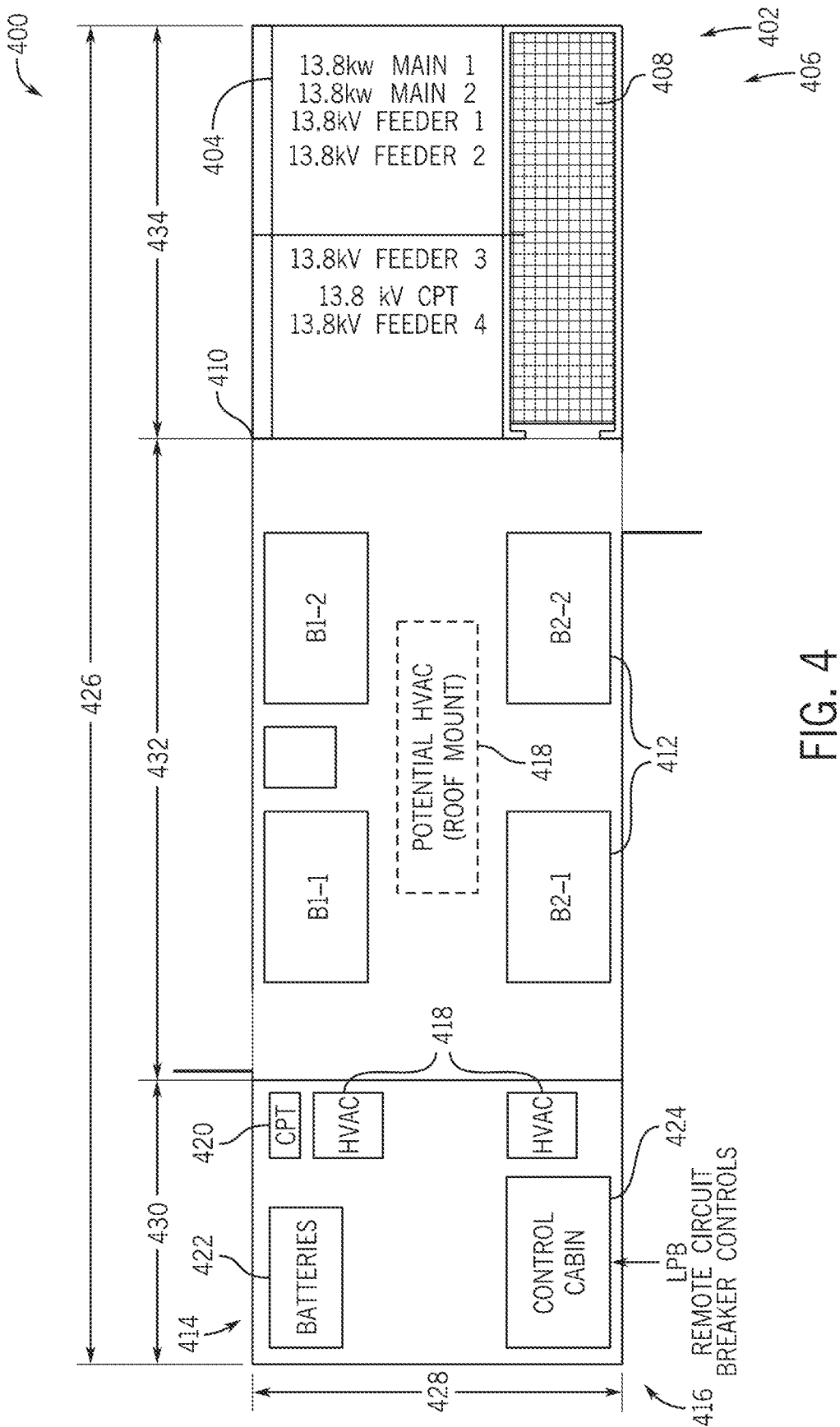
FIG. 4 is a top plan view of an embodiment of the oversized switchgear trailer, in accordance with embodiments of the present disclosure.

FIG. 4 is a schematic top plan view of an embodiment of the oversized switchgear trailer configuration 400, such as the SWGR 302. The illustrated embodiment combines all of the switchgear breakers onto a single oversized trailer. It does not eliminate redundant components, however, other embodiments may eliminate redundant components. A 3000A bus portion is illustrated along with further 1200A buses that can each distribute power to 6 pieces of frac equipment. A control power transformer (CPT) is used to power onboard instrumentation, breaker open/close functions, HVAC, lighting, and batteries for offline operations. It should be appreciated that various components may also be arranged outside of an enclosure or the like, and may be arranged on a tongue of the trailer. The control cabin (which may also be referred to as external controls) will house the remote breaker open/close functions, remote lockout relay resets, remote laptop connections, any HMI screens or other instrumentation displays. In this embodiment, main breakers on a common 3000A bus are used to load share power from multiple generators while feeder breakers on the same 3000A bus are used as bus connectors to safely distribute power to the lower rated 1200A bus sections with the lower rated feeder breakers. The 1200A distribution sections can supply up to 6 pieces of equipment each for a total of 24. It is important to note that more than 24 feeders can be installed as well as more than 2 or 3 main breakers.

The illustrated embodiment includes a trailer 402, which may also be referred to as an oversized trailer, that includes a first or primary bus portion 404 (which may also be referred to as a primary switchgear 404) arranged at a rear 406 of the trailer. It should be appreciated that positioning components at the rear may be for illustrative purposes only, unless otherwise specified, and that various components may be arranged differently than the illustrated embodiment for convenience, health, safety, environment (HSE) considerations, or the like. The rear 406 further includes a walkway 408, which may provide access to an enclosure 410 that houses second or secondary bus portions 412 (which may also be referred to as a secondary switchgear). As noted above, the enclosure may include HVAC equipment 418, which may be roof mounted, to control temperature and moisture within the enclosure 410. Such an arrangement is advantageous when considering the electrical components and also the harsh conditions typically associated with well sites.

The illustrated trailer 402 further includes a tongue section 414 at a front 416, opposite the rear 406, which may house and/or store one or more components. It should be appreciated that these components may not be covered or enclosed, but in various embodiments, may include shades or weather coverings. An example of components, which is not intended to be limiting, including additional or substitute HVAC equipment 418, a CPT 420, batteries 422, and a control cabin 424 (e.g., external controls), which may include remote circuit breaker controls. As a result, several trailers worth of components may be positioned on the illustrated trailer 402 to simplify well layouts, among other advantages.

Turning to the bus portions 404, 412, the primary bus 404 may include 13.8 kV mains and feeders, for example, 2 13.8 kV mains, 4 13.8 kV feeders, and a 13.8 kV CPT. The primary bus 404 may receive a power cable from a switchgear feeder to the mains. The secondary bus portion 412, which is illustrated as 4 different components in the illustrated embodiment, may include 24 feeder connections for supplying power to the fracturing equipment at the well site.

As noted above, in various embodiments, the configuration 400 may utilize an oversized trailer having dimensions that do not restrict or otherwise affect portability of the fracturing operations. In other words, the dimensions may be substantially equal to or less than another component that dictates mobility. In the illustrated embodiment, the trailer 402 has a length 426 and a width 428. The length 426, in embodiments, may be approximately 60 feet. The width 428, in embodiments, may be approximately 11.5 feet. Furthermore, it should be appreciated that a tongue length 430, an enclosure length 432, and a rear length 434 may be particularly selected based on operating conditions. The illustrated tongue length 430 is approximately 10 feet, the illustrated enclosure length 432 is approximately 28 feet, and the illustrated rear length 434 is approximately 22 feet. Furthermore, various openings, walkways, and the like may have predetermined dimensions to enable ingress and egress.

Figure 5:
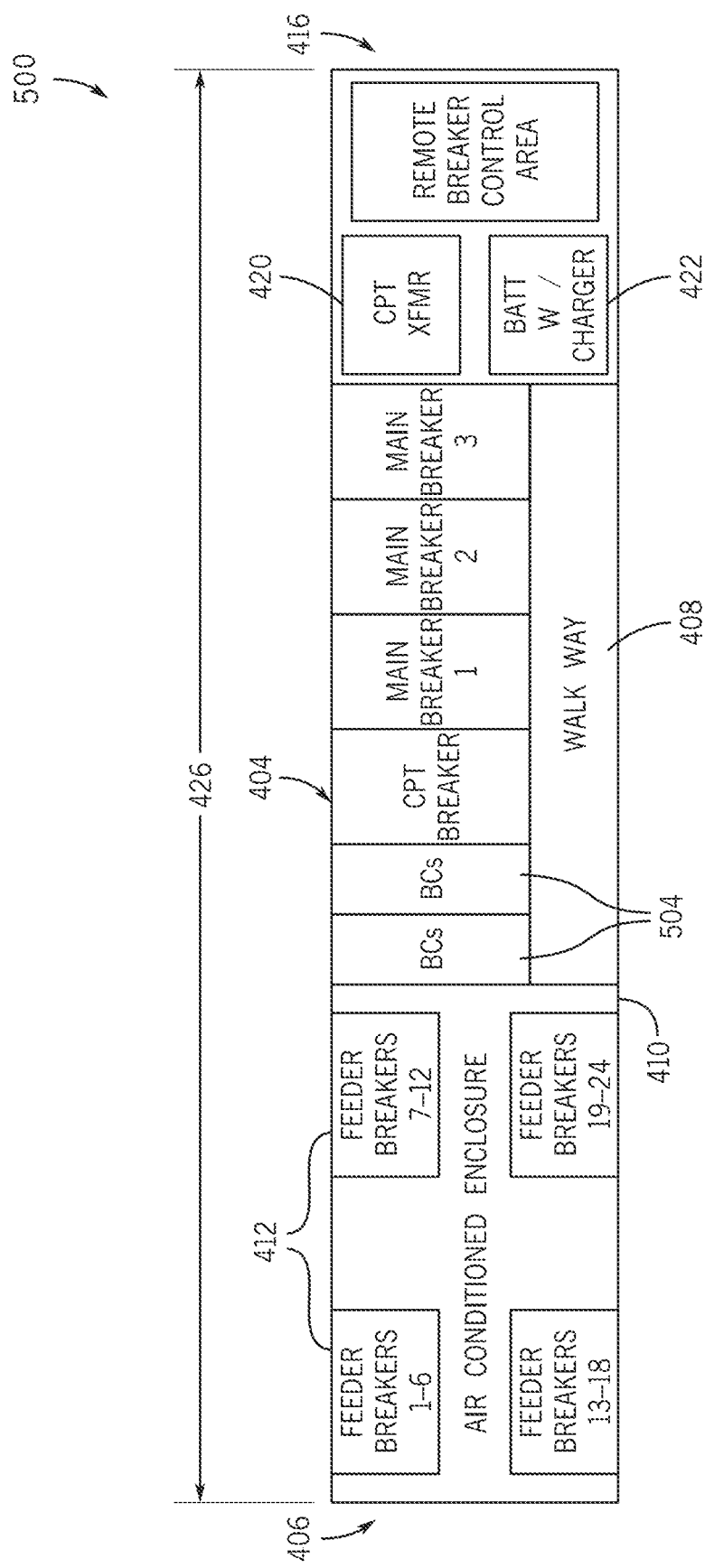
FIG. 5 is a top plan view of an embodiment of an oversized switchgear trailer, in accordance with embodiments of the present disclosure.

FIG. 5 is a top plan view of an embodiment of an oversized switchgear trailer. The illustrated configuration 500 shows a different orientation when compared to the embodiment shown in FIG. 4, but in various embodiments may share one or more features and/or dimensions. In this embodiment, a front 416 of the trailer 402 includes the CPT 420 and battery 422 at the tongue section 414. Moreover, the primary bus 404 is arranged between the enclosure 410, including the second bus 412, and the tongue section 414. As noted above, the primary bus 404 may include incoming breakers. Compared to the embodiment of FIG. 4, the present embodiment uses smaller, cheaper fused switches for a smaller space. As a result, a length 402 of the primary bus 404 may be reduced (for example to approximately 18 feet compared to the 22 foot configuration in FIG. 4.) This embodiment includes three main breakers and two cabinets for bus connectors (BCs) 504. The illustrated embodiment also includes the enclosure 410 having the secondary bus 412.

As noted above, utilizing features of FIG. 5 may enable a shorter overall length 426. For example, certain embodiments of FIG. 4 may have the length of approximately 60 feet. Features associated with FIG. 5 may reduce that length to approximately 53 feet. This space saving may be significant at the well site, where all space is at a premium and various trailers may be positioned very closely to other trailers.

Figure 6:
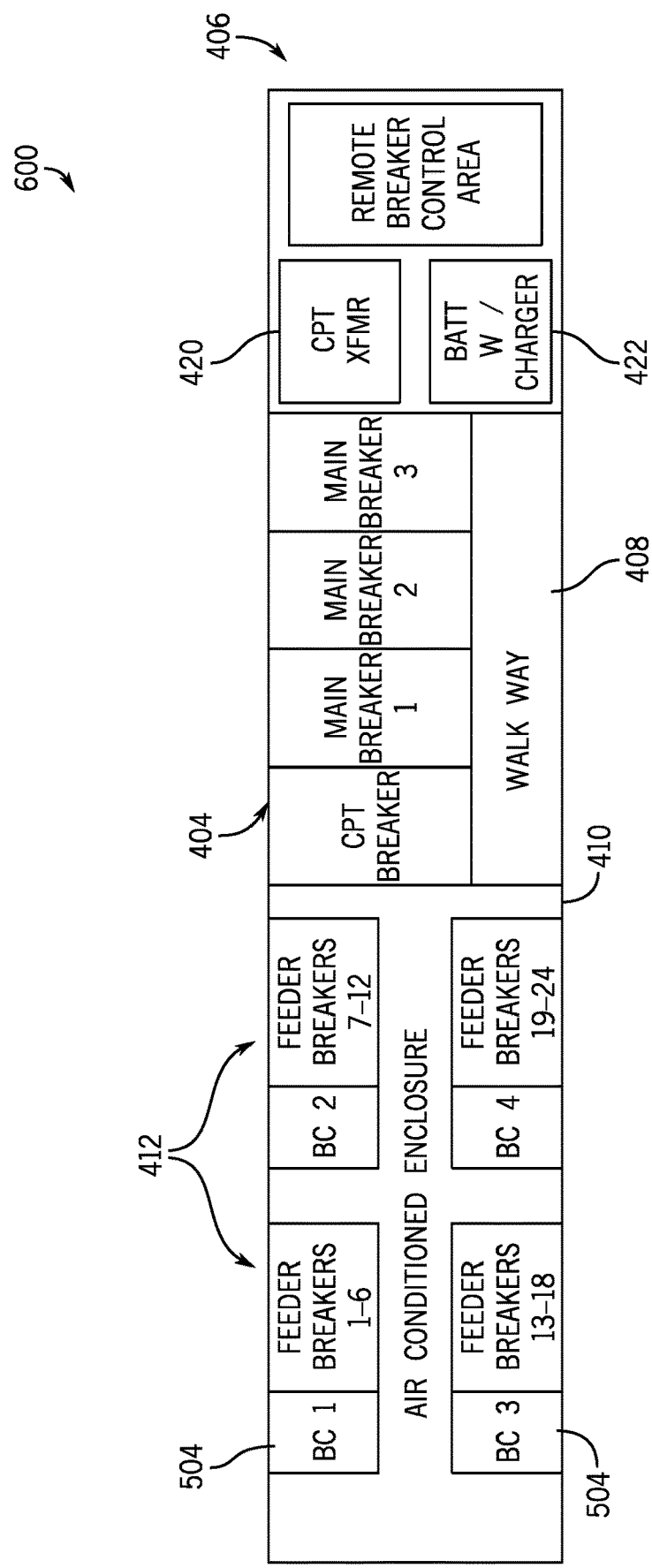
FIG. 6 is a top plan view of an embodiment of an oversized switchgear trailer, in accordance with embodiments of the present disclosure.

FIG. 6 is a top plan view of an embodiment of an oversized switchgear trailer. The illustrated configuration 600 shows a different orientation when compared to the embodiments shown in FIGS. 4 and 5, but in various embodiments may share one or more features and/or dimensions. In this embodiment, the bus connectors are moved to the smaller 1200A sections (e.g., second bus 412). This arrangement allows the trailer to be shortened even more due to the bus connectors 504 being rated for a lower amperage bus section.

Figure 11:
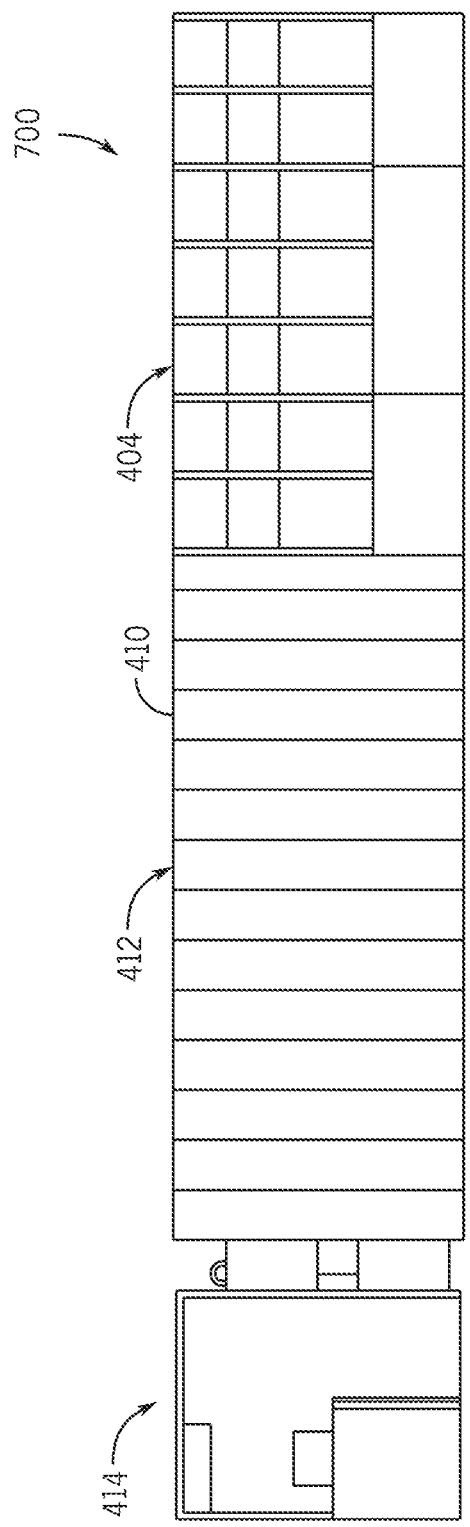
Figure 13:
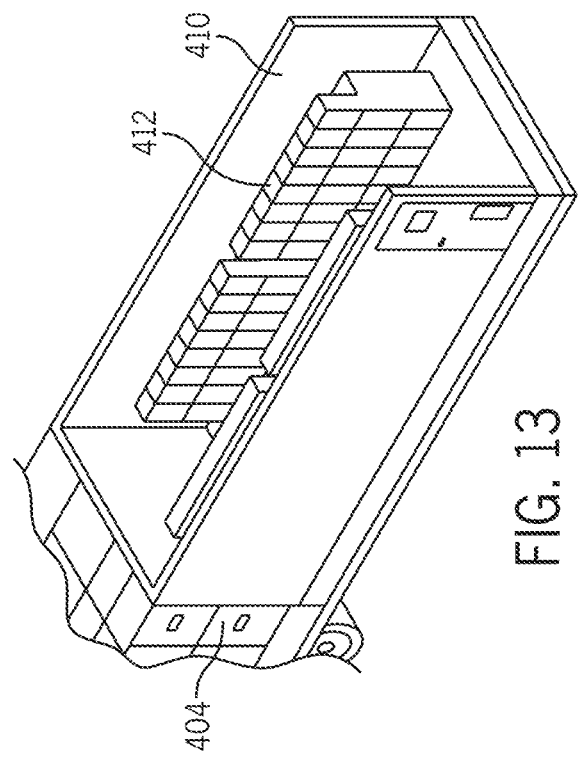
Figure 12:
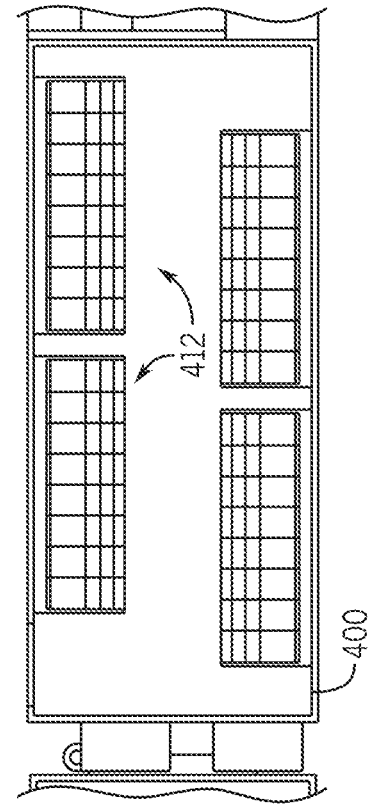

FIGS. 7-13 provide perspective, side, and top plan views of embodiments of the oversized switchgear trailer. FIGS. 11-13 provide a cross section of the "B" portion of the switchgear trailer (also known as the feeder breakers, outgoing breakers, or distribution breakers).

Figure 7:
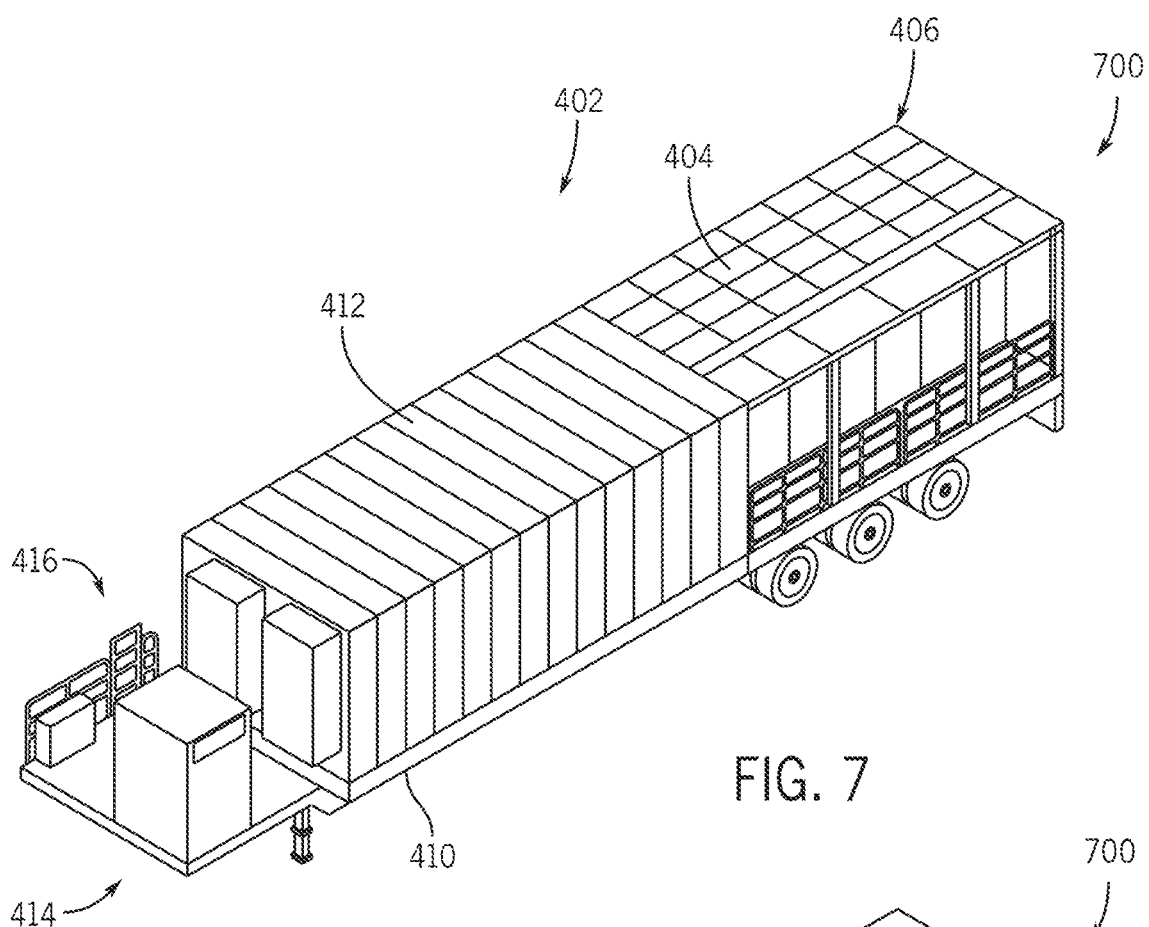

FIG. 7 is a perspective view of an embodiment of a configuration 700 that includes the primary bus 404 and the secondary bus 412, each arranged at different platforms or segments along the trailer 402. As shown, the tongue section 414 is arranged at the front 416 and includes various support components. The primary bus 404 is positioned near the rear 406 and includes the walkway 408 having an overhang, for example, to enable an operator to work out of the elements and/or protected from rain, sun, etc. Further illustrated is the enclosure 410 housing the secondary bus 412.

Figure 8:
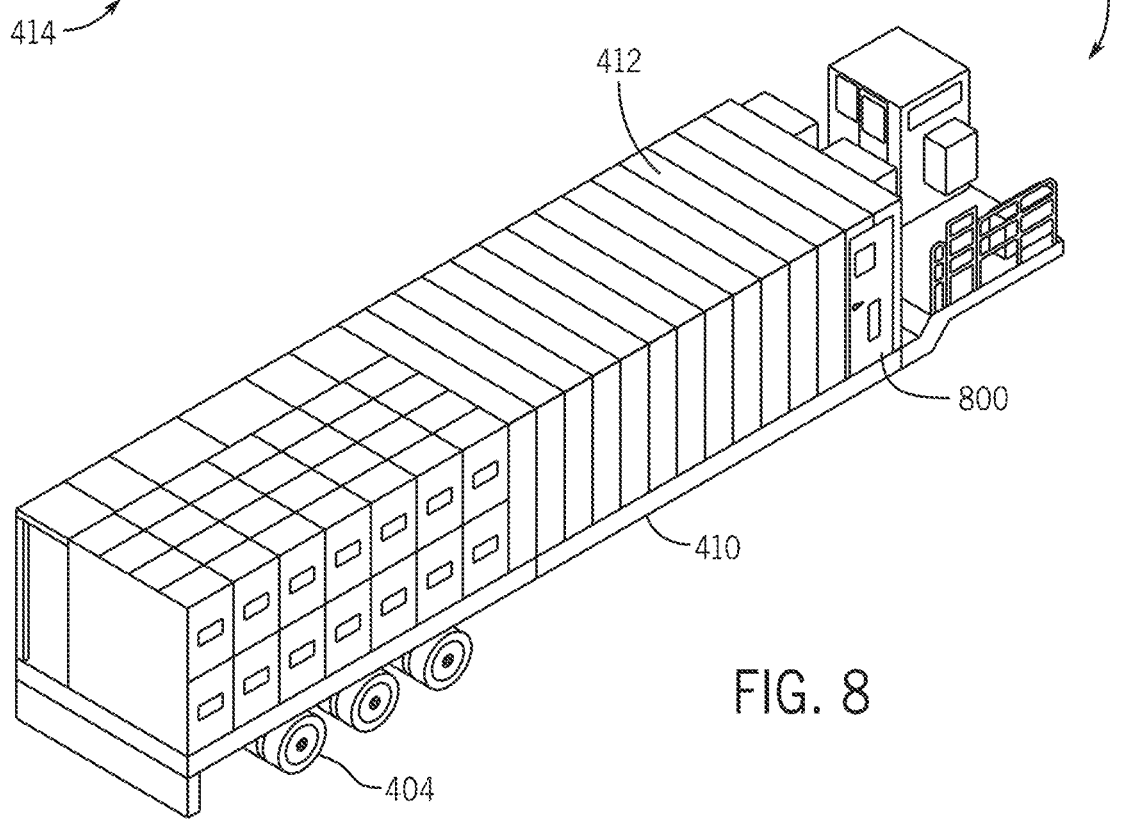

FIG. 8 is a rear perspective view of the configuration 700, further illustrating a door 800 for entry into the enclosure 410. In various embodiments, the power cables would extend from the primary bus 404 feeders to the incoming mains on the switchgear through the center of the substructure, which is mounted below the enclosure 410 and not visible in the illustrated embodiment.

FIGS. 9 and 10 are side elevational views of the configuration 700, further illustrating the features of the primary bus 404, enclosure 410, and the like. Illustrated in FIGS. 9 and 10 is a feed connection bulkhead area 900. As will be appreciated, these connections may be utilized to connect to equipment at the well site and may be arranged at ground level to simplify access for operators at the site. The side views of FIGS. 9 and 10 further illustrate cable access areas 902, under the primary bus 404, which may receive cables from the one or more generators.

FIG. 11 is a top plan view of the configuration 700 illustrating the corresponding locations of the primary bus 404, enclosure 410, and the tongue section 414. The configuration shown in FIG. 11 shares one or more similarities with FIG. 4 regarding the layout of the components.

FIGS. 12 and 13 are perspective views of the enclosure 410 including the secondary bus 412 where certain features have been removed to provide access to the interior of the enclosure 410. As shown, the secondary bus 412 includes a lineup that provides space for access and movement by an operator within the enclosure 410.

Figure 14:
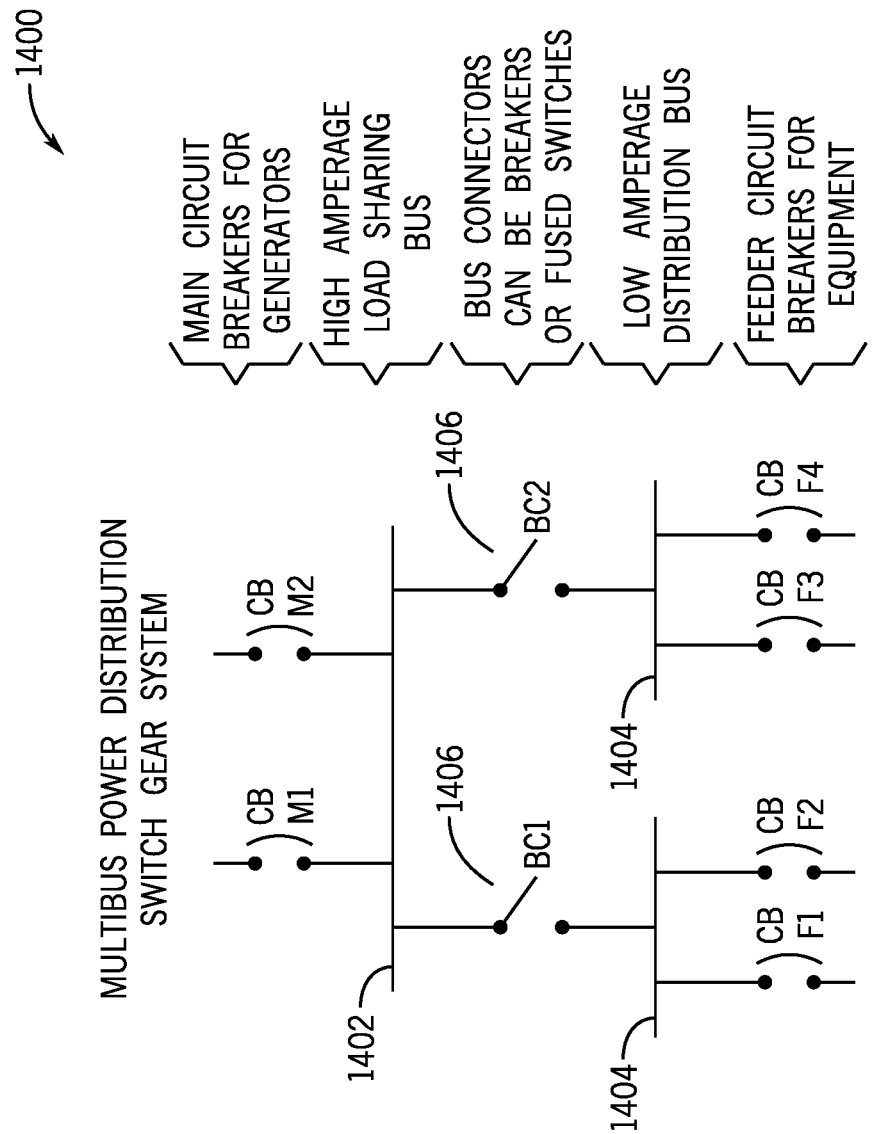
FIG. 14 is a schematic diagram of an embodiment of a multi-bus power distribution switchgear system, in accordance with embodiments of the present disclosure.

FIG. 14 is a schematic diagram of an embodiment of a multi-bus power distribution switchgear system 1400. The illustrated embodiment incorporates using multiple bus sections 1402, 1404 that are rated for different amperage to allow for different breaker configurations to achieve a specific size, capability, and/or price. The bus connectors (BC) 1406 are between the different bus sections 1402, 1404 and may be configured to meet NEC code for bus bar and cable protection. The illustrated embodiment only shows two main breakers, two bus connectors, and four feeder breakers for simplicity. However, as described above, in various embodiments, up to 3 main breakers, 4 bus connectors, and 24 feeder breakers may be used.

Figure 15:
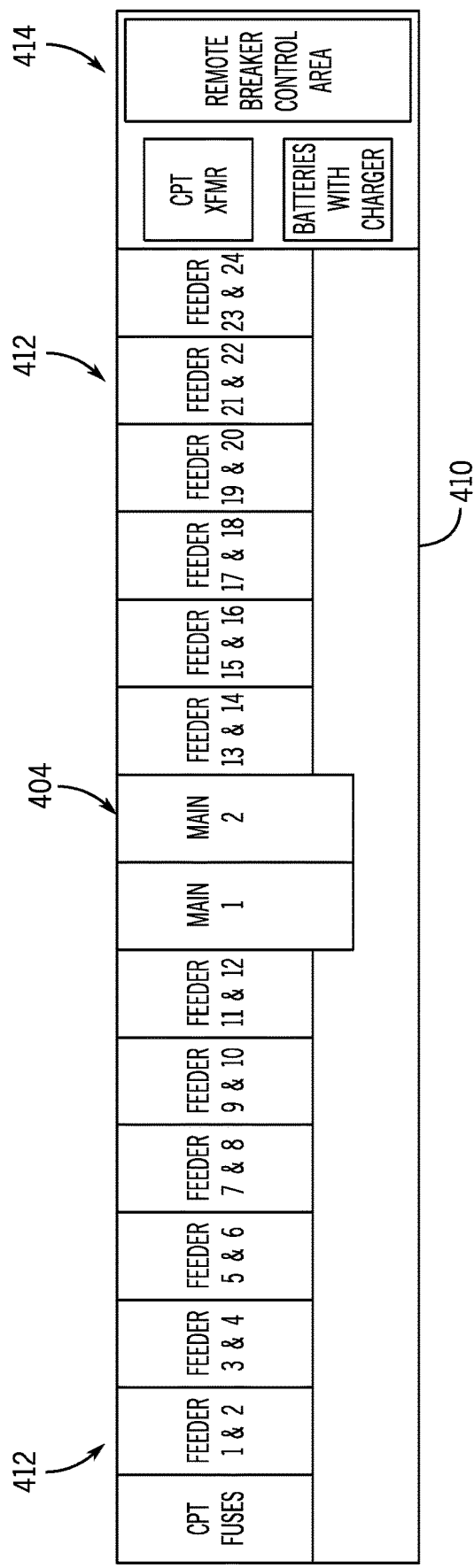
FIG. 15 is a top plan view of an embodiment of an oversized switchgear trailer, in accordance with embodiments of the present disclosure.

FIG. 15 is a top plan view of an oversized switchgear trailer. A different style feeder breaker is used, when compared to other embodiments illustrated herein, which is slightly larger but is compatible with a 2000A bus and can be stacked. The main breakers can have a switch which can be used by technicians to verify that there is a visible disconnect (similar to the prior embodiment). The overall length and width of this trailer is greatly reduced when compared to other configurations discussed herein.

Figure 16:
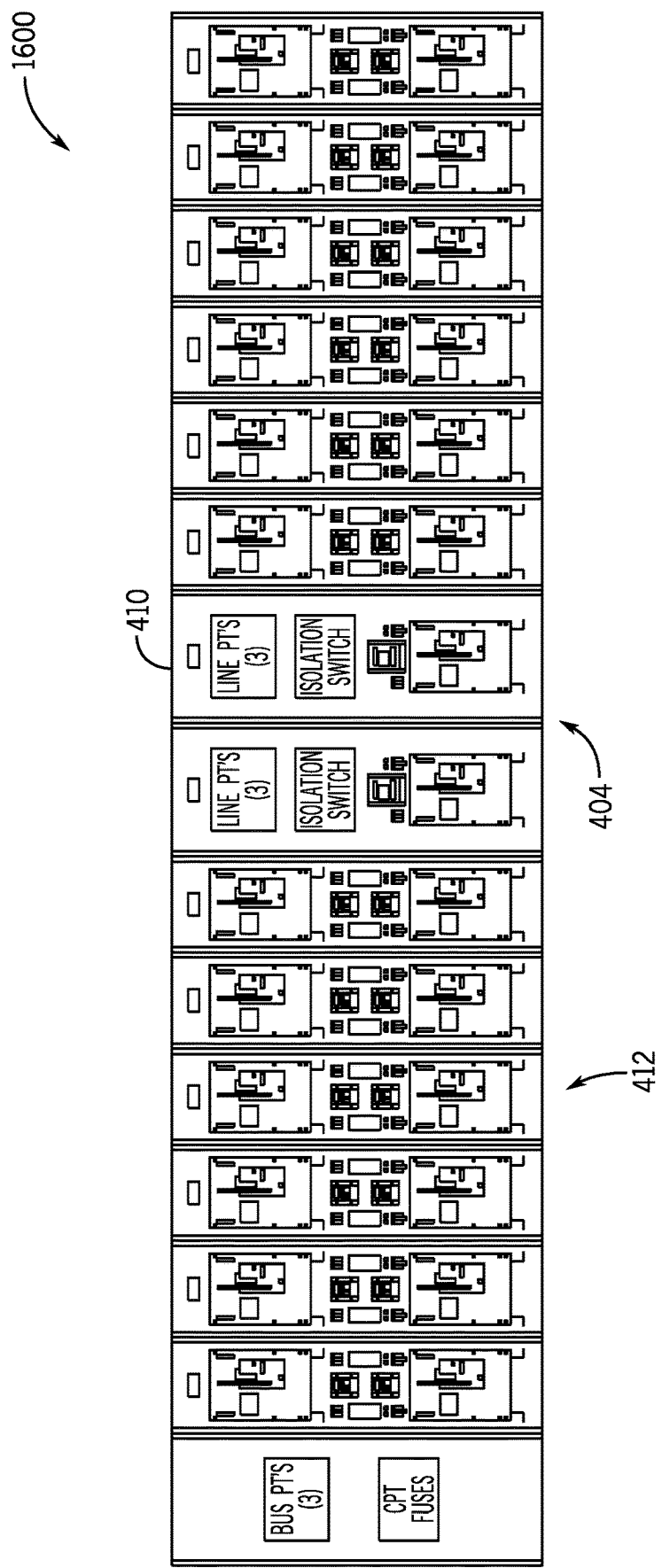
FIG. 16 is a schematic diagram of an embodiment of a consolidated trailer, in accordance with embodiments of the present disclosure.

FIG. 16 is a schematic diagram of a consolidated trailer 1600. In various embodiments, the consolidated switchgear trailer may be utilized on a single bus power distribution system. A single continuous 3000A or 2000A bus would load share power from the incoming (main) breakers and distribute to the outgoing (feeder) breakers to the frac equipment. Because these breakers are compatible with the higher amperage bus work, they are physically larger and more expensive than breakers designed for a 1200A bus. However, interconnecting bus connectors (as breakers, fuses, and/or switches) to safely distribute power between differently rated bus sections are no longer needed which can offset the physical size and cost increase.

Figure 17:
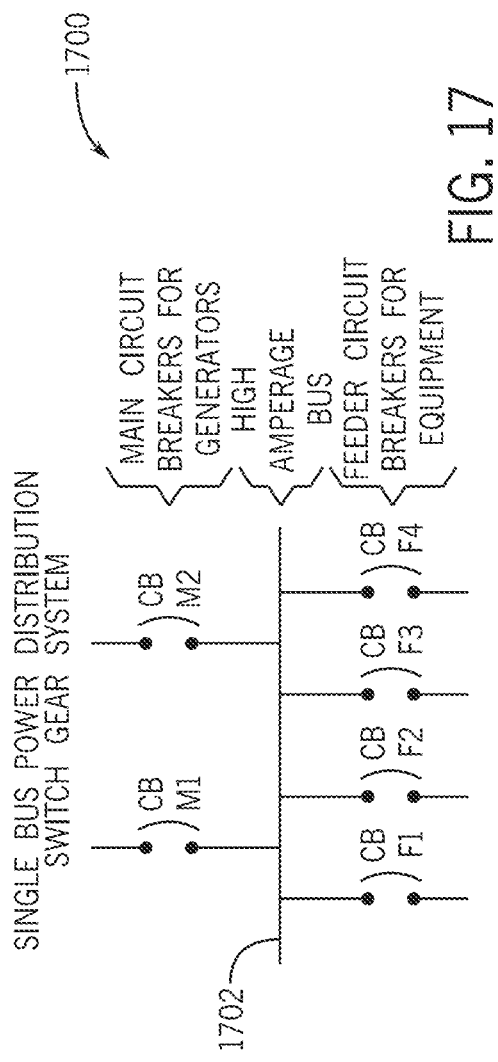
FIG. 17 is a schematic diagram of an embodiment of a single bus power distribution switchgear system, in accordance with embodiments of the present disclosure.

FIG. 17 is a schematic diagram of an embodiment of a single bus power distribution switchgear system 1700. In the illustrated embodiment, as compared to the previous embodiments, only a single common bus 1702 is used. The Single Bus Power Distribution Switchgear System allows bus connectors and different bus sections to be eliminated. However, each breaker is configured to be compatible with the higher amperage bus and can, therefore, utilize larger and more expensive gear.

Figure 18:
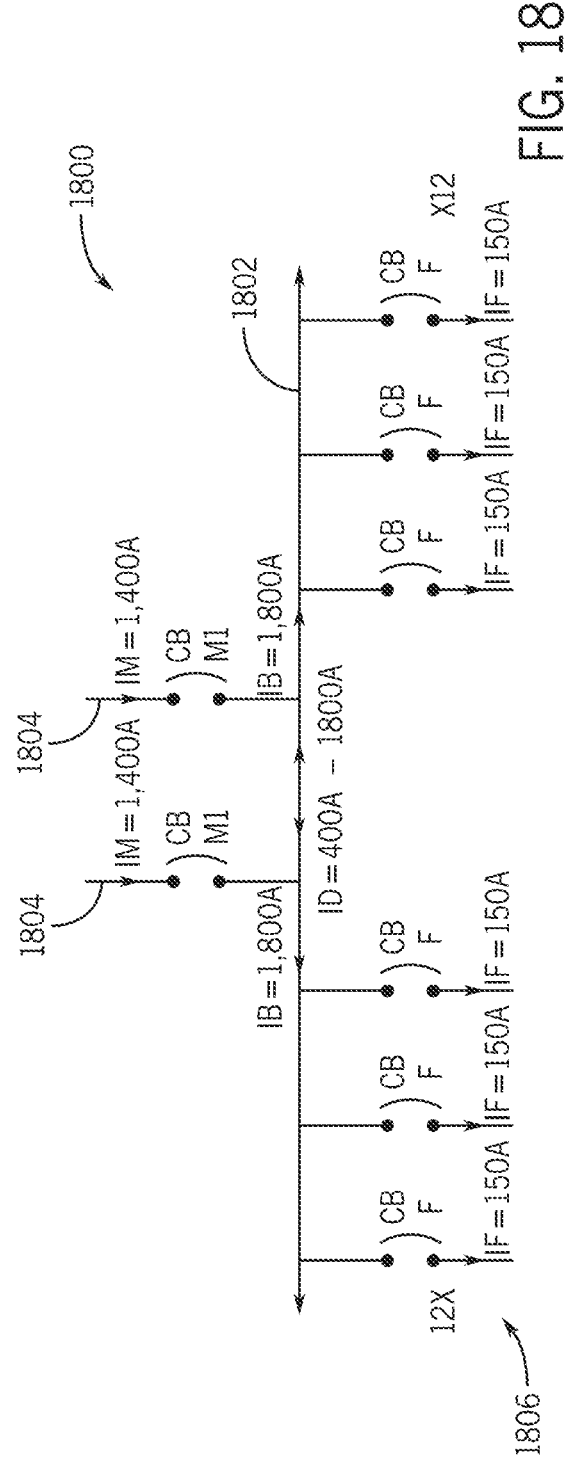
FIG. 18 is a schematic diagram of an embodiment of a load sharing configuration, in accordance with embodiments of the present disclosure.

FIG. 18 is a schematic diagram of an embodiment of a load sharing configuration 1800. The illustrated embodiment may effectively load share nearly 3000A of current on a single 2000A common bus 1802. If the incoming power is physically entering the bus work in the middle, and the breakers to either side of the bus work can only ever draw a maximum of less than 2000A, a 2000A bus will be acceptable. In the example above, two main breakers 1804 are supplying up to 1400A (IM) each for a maximum of 2800A. If there are 12 feeders 1806 each capable of drawing up to 150A (IF) on each on either side of the bus work 1802, there would only be a maximum of 1800A (IB) of current flowing outward from the main breaker connections onto the bus work 1802. In FIG. 18, for simplicity, IM=Main Breaker Current, IB=Bus Current, ID=Differential Current, IF=Feeder Current. The differential current is the maximum current that could flow between the two main breakers. This is the load sharing where the common bus 1802 will allow current from either main breaker (generators) to power either side of the bus work (frac equipment).

It should be appreciated that embodiments of the present disclosure may be utilized to power any electrical equipment, which may include as non-limiting examples: drilling rigs, coil tubing units, nitrogen, acid pump, hydraulic fracturing pumps, dual pumpers, pump down pumps, blenders, hydration units, sand equipment, dust mitigation equipment, work over rigs, auxiliary equipment, wire line trailers, cranes, and a variety of other oilfield equipment. Furthermore embodiments may also be used for microgrids in other industries beyond the oilfield. Additionally, the single switchgear can be utilized with other equipment to send power long distances including up to 3 miles or more. In embodiments, different power sources can be used including diesel generators, grid power, turbine generators, natural gas generators, battery banks, and other power sources. It should be appreciated that one or more power sources may be utilized.

The present disclosure described herein, therefore, is well adapted to carry out the objects and attain the ends and advantages mentioned, as well as others inherent therein. While a presently preferred embodiment of the disclosure has been given for purposes of disclosure, numerous changes exist in the details of procedures for accomplishing the desired results. These and other similar modifications will readily suggest themselves to those skilled in the art, and are intended to be encompassed within the spirit of the present disclosure disclosed herein and the scope of the appended claims.

The invention claimed is:

1. A hydraulic fracturing system for fracturing a subterranean formation, comprising:
   a primary switchgear, arranged on a support structure, the primary switchgear electrically coupled to a power source to receive electrical power from the power source;
   a secondary switchgear, arranged on the support structure, the secondary switchgear positioned separately from the primary switchgear and within an enclosure, the secondary switchgear receiving an electrical input from the primary switchgear and including a plurality of feed connections for supplying the electrical power to a plurality of fracturing equipment; and
   support equipment, arranged on the support structure, the support equipment providing one or more services to at least the secondary switchgear,
   wherein at least one of the primary switchgear or the secondary switchgear is a single-bus power distribution system, the single-bus power distribution system comprising:
   a single common high amperage bus receiving energy from one or more generators of the power source at one or more main breakers, the single common high amperage bus distributing the electrical power to a feeder circuit, the single common high amperage bus is rated for at least 2000A.

2. The hydraulic fracturing system of claim 1, further comprising:
   a walkway arranged proximate the primary switchgear, the walkway extending along at least a portion of the support structure and providing access to a door of the enclosure housing the secondary switchgear.

3. The hydraulic fracturing system of claim 1, wherein the support equipment includes at least one of HVAC equipment, a control power transformer, a battery, or external controls.

4. The hydraulic fracturing system of claim 1, further comprising:
   a cable routing area positioned to extend from the primary switchgear to the secondary switchgear, the cable routing area being predetermined and consolidating one or more cables utilized to transmit the electrical power from the primary switchgear to the secondary switchgear.

5. The hydraulic fracturing system of claim 1, wherein the support structure includes at least one of a trailer, a skid, or a truck.

6. The hydraulic fracturing system of claim 1, wherein the enclosure is climate controlled.

7. The hydraulic fracturing system of claim 1, wherein a length of the support structure is less than or equal to a length of an associated support structure of one or more components of the hydraulic fracturing system.

8. The hydraulic fracturing system of claim 1, wherein the single common high amperage bus is rated for 3000A.

9. The hydraulic fracturing system of claim 1, wherein the support structure includes a feed connection bulkhead to receive the electrical power from the power source.

10. An electrical distribution system for providing electrical to hydraulic fracturing equipment, comprising:
- a primary bus, arranged on a support structure, electrically coupled to at least one generator, the at least one generator providing electrical power to a breaker coupled to the primary bus, the breaker also arranged on the support structure; and
- a secondary bus, arranged on the support structure, electrically coupled to the primary bus via at least one cable,
- the secondary bus being positioned within an enclosure and including a plurality of feed connections for supplying the electrical power to at least one piece of the hydraulic fracturing equipment,
- wherein the secondary bus comprises a single-bus power distribution system having a single common high amperage bus receiving the electrical power from the at least one generator at one or more main breakers and distributing the electrical power to a feeder circuit, the single common high amperage bus is rated for at least 2000A.

11. The electrical distribution system of claim 10, wherein the support structure includes at least one of a trailer, a skid, or a truck.

12. The electrical distribution system of claim 10, wherein the enclosure is climate controlled and positioned separately from the primary bus.

13. The electrical distribution system of claim 10, wherein a length of the support structure is less than or equal to a length of an associated support structure of one or more components of the hydraulic fracturing system.

14. The electrical distribution system of claim 10, wherein the single common high amperage bus is rated for 3000A.

15. The electrical distribution system of claim 10, wherein the support structure includes a feed connection bulkhead to receive the electrical power from the at least one generator.

16. The electrical distribution system of claim 10, wherein the at least one piece of the hydraulic fracturing equipment includes at least one of HVAC equipment, a control power transformer, a battery, or external controls.

* * * * *